(12) United States Patent
Lee et al.

(10) Patent No.: US 10,279,481 B2
(45) Date of Patent: May 7, 2019

(54) ELECTRONIC DEVICE AND CRADLE THEREFORE

(71) Applicant: Samsung Electronics Co., Ltd., Suwon-si (KR)

(72) Inventors: So Hee Lee, Seoul (KR); Won Ho Shin, Suwon-si (KR); No San Kwak, Suwon-si (KR); Kyung Shik Roh, Seongnam-si (KR); Joong Kyung Park, Suwon-si (KR); Suk June Yoon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 189 days.

(21) Appl. No.: 15/248,189

(22) Filed: Aug. 26, 2016

(65) Prior Publication Data
US 2017/0165843 A1      Jun. 15, 2017

(30) Foreign Application Priority Data

Dec. 15, 2015   (KR) ........................ 10-2015-0179265

(51) Int. Cl.
| | |
|---|---|
| *B25J 9/16* | (2006.01) |
| *H04N 7/18* | (2006.01) |
| *G06K 9/00* | (2006.01) |
| *G06K 9/32* | (2006.01) |

(52) U.S. Cl.
CPC ........ *B25J 9/1697* (2013.01); *G06K 9/00228* (2013.01); *G06K 9/3216* (2013.01); *H04N 7/185* (2013.01)

(58) Field of Classification Search
CPC .... B25J 11/001; B25J 11/0015; B25J 9/0003; B25J 9/1697; B25J 11/0005; G05D 1/0225; G06K 9/00664; G06F 3/00; H04N 7/185; H02J 17/00; H02J 7/0044; H02J 7/025
See application file for complete search history.

(56) References Cited

U.S. PATENT DOCUMENTS

| | | | |
|---|---|---|---|
| 2004/0223062 A1 | 11/2004 | Pettegrew et al. | |
| 2006/0287770 A1* | 12/2006 | Ishihara | G10H 1/26 700/245 |

(Continued)

FOREIGN PATENT DOCUMENTS

WO    2012-112502    8/2012

OTHER PUBLICATIONS

International Search Report dated Dec. 12, 2016 in International Patent Application No. PCT/KR2016/009693.

*Primary Examiner* — Dale Moyer
(74) *Attorney, Agent, or Firm* — Staas & Halsey LLP

(57) ABSTRACT

An electronic device to be put on a cradle may include a housing including a part in a hemispherical shape and physically coming into contact with the cradle in an arbitrary position when the electronic device is put on the cradle, a display arranged on another part of the housing, a camera module to obtain an image in a direction that the display faces, a sensor module to sense an orientation of the electronic device; and a processor to determine a target orientation of the electronic device based on the obtained image, and create control data to change the orientation of the electronic device based on the sensed orientation and the target orientation of the electronic device.

20 Claims, 24 Drawing Sheets

(56) References Cited

U.S. PATENT DOCUMENTS

| | | | |
|---|---|---|---|
| 2007/0192910 A1* | 8/2007 | Vu | B25J 5/007 |
| | | | 700/245 |
| 2012/0209433 A1* | 8/2012 | Paz Rodriguez | B25J 5/007 |
| | | | 700/259 |
| 2013/0288743 A1 | 10/2013 | Hunt et al. | |
| 2014/0267775 A1 | 9/2014 | Lablans | |
| 2014/0277735 A1 | 9/2014 | Breazeal | |
| 2015/0189175 A1 | 7/2015 | Fan et al. | |
| 2015/0224640 A1* | 8/2015 | Vu | B25J 5/007 |
| | | | 700/259 |

\* cited by examiner

ELECTRONIC DEVICE AND CRADLE THEREFORE

CROSS-REFERENCE TO RELATED APPLICATION

This application claims priority to and the benefit of Korean Patent Application No. 10-2015-0179265, filed on Dec. 15, 2015, the disclosure of which is incorporated herein by reference in its entirety.

BACKGROUND

1. Field

The following description relates to an electronic device and cradle therefore, and more particularly, to an electronic device and cradle therefore to change the orientation of the electronic device put on the cradle through interaction with the cradle.

2. Description of the Related Art

With development of communication and computer technologies, intelligent electronic devices have emerged, which are able to recognize surrounding conditions, interact with the user to provide information required by the user, and move to a desired position by using a separate driver included in the electronic device. The intelligent electronic device may perform a user-friendly operation or a respondent operation through the driver, and may be able to recognize the face and voice of the user and respond to the user's motion, voice, etc.

The intelligent electronic device may have the form of a mobile robot, which, however, puts limitations on places as well as reduces portability, thereby making it difficult for the user to carry it around.

SUMMARY

Additional aspects and/or advantages will be set forth in part in the description which follows and, in part, will be apparent from the description, or may be learned by practice of the disclosure.

The present disclosure provides an electronic device and cradle therefore, the electronic device having an appearance for the user to carry around easily, and movement of the electronic device controlled by interaction between the cradle and the electronic device while the electronic device is put on the cradle.

In accordance with an aspect of the present disclosure, an electronic device to be put on a cradle may include a housing including a part in a hemispherical shape and physically coming into contact with the cradle in an arbitrary position when the electronic device is put on the cradle, a display arranged on another part of the housing, a camera module to obtain an image in a direction that the display faces, a sensor module to sense an orientation of the electronic device; and a processor to determine a target orientation of the electronic device based on the obtained image, and create control data to change the orientation of the electronic device based on the sensed orientation and the target orientation of the electronic device.

The control data may include at least one of information regarding an orientation of the electronic device, information regarding a target orientation, and information regarding speed and/or acceleration of movement of the electronic device.

The electronic device may further include a communication module. The processor may send the control data to the cradle through the communication module.

The electronic device may come into contact with an operation leg included in the cradle when the electronic device puts on the cradle. The orientation of the electronic device may be changed by the operation leg.

The electronic device may further include a driver. The processor may control the driver to change an orientation of the electronic device based on the control data.

The driver may include a first motor to rotate the housing of the electronic device around a first axis and a second motor to rotate the housing around a second axis.

The first and second axes may be perpendicular to each other.

The driver may include a first shaft to transfer rotation of the first motor to the second motor and a second shaft to transfer rotation of the second motor to the housing.

The first shaft rotates around the first axis, and the second shaft may rotate around at least one of the first and second axes.

The first motor may be in a fixed position by magnets if the electronic device is put on the cradle.

The second motor may be rotated around the first axis if the electronic device is put on the cradle.

The housing may be rotated around at least one of the first and second axes if the electronic device is put on the cradle.

The electronic device may further include a wireless power receiver. The wireless power receiver may receive wireless power from the cradle if the electronic device is put on the cradle.

The processor may receive wireless power from the cradle based on a signal output from the sensor module.

The electronic device may sense an orientation of the electronic device through the sensor module when the electronic device puts on the cradle.

In accordance with an aspect of the present disclosure, a method for controlling an electronic device to be put on a cradle may include sensing an orientation of the electronic device, obtaining an image in a direction that a display faces, determining a target orientation of the electronic device based on the obtained image, and creating control data to change an orientation of the electronic device based on the sensed orientation and the target orientation of the electronic device.

The control data may include information regarding an orientation of the electronic device and information regarding a target orientation.

The method may further include sending the control data to the cradle through a communication module.

The method may further include controlling a driver of the electronic device to change an orientation of the electronic device based on the control data.

The method may further include receiving wireless power from the cradle if the electronic device is put on the cradle.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
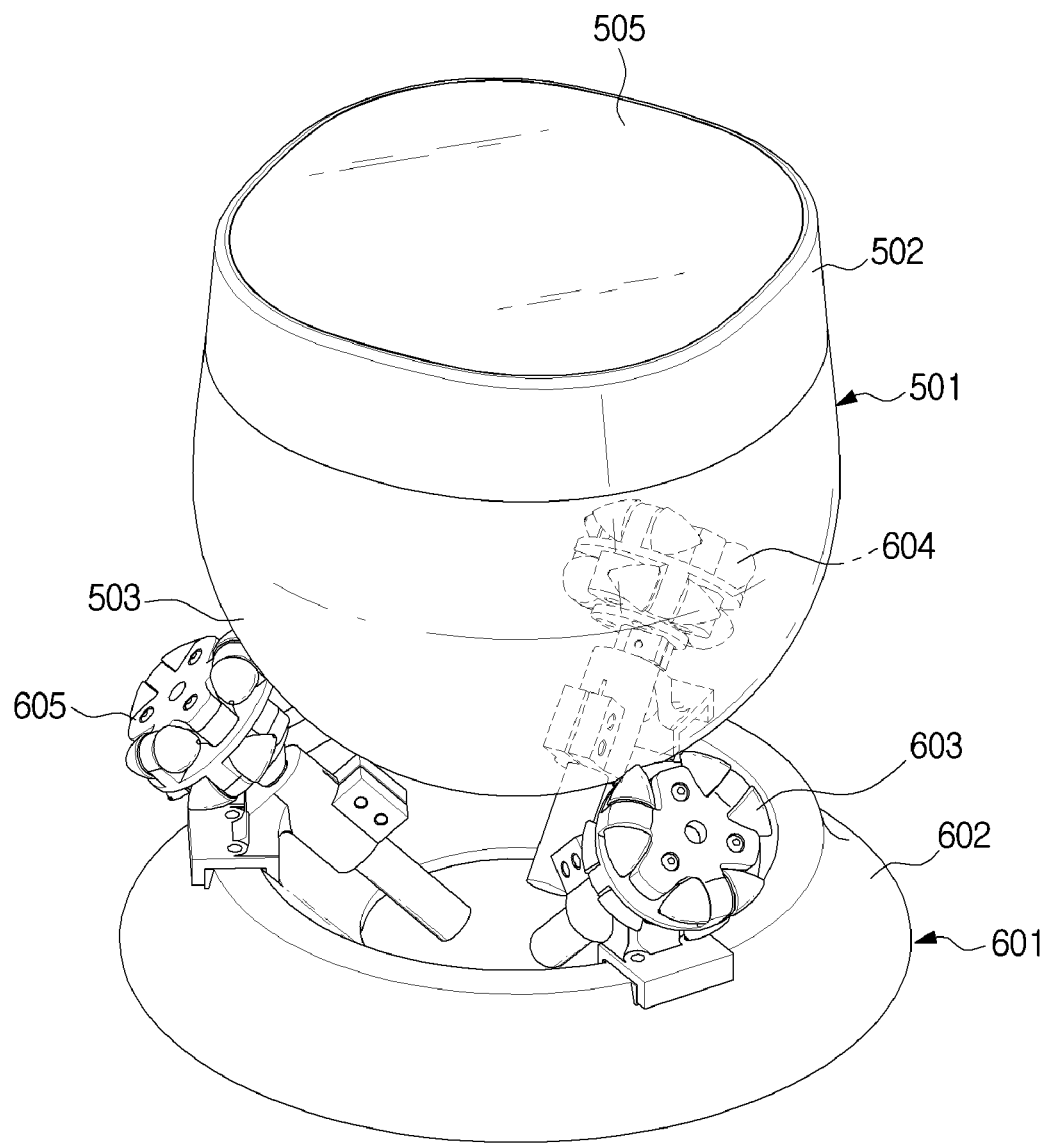
FIG. 1 illustrates an electronic device and cradle therefore, according to an embodiment of the present disclosure.

Reference will now be made in detail to the embodiments, examples of which are illustrated in the accompanying drawings, wherein like reference numerals refer to like elements throughout. The embodiments are described below to explain the present disclosure by referring to the figures.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" refers to any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged technologies. Hereinafter, an embodiment of the present disclosure will be described in detail with reference to the accompanying drawings.

An electronic device according to various embodiments of the present disclosure will now be described with reference to accompanying drawings. The term "user" as herein used may refer to a person who uses the electronic device or a device (e.g., an artificially intelligent device) that uses the electronic device.

FIG. 1 illustrates an electronic device and cradle therefore, according to an embodiment of the present disclosure.

Referring to FIG. 1, an electronic device 501 and a cradle 601 are shown.

The electronic device 501 may include housings 502, 503. The housings 502, 503 may be divided into a head unit 502 and a body unit 503.

The head unit 502 may be formed on the top of the body unit 503. The head unit 502 and the body unit 503 may be implemented in the forms corresponding to a person's head and body, respectively, in an embodiment. For example, the head unit 502 may include a front cover 505 to correspond to a person's facial form.

An image may be displayed on the front cover 505 of the electronic device 501, and for this, the electronic device 501 may include a display 512 arranged in a position corresponding to the front cover 505.

For example, the display may be arranged on the inner side of the front cover 505, and the front cover 505 may be formed of a transparent or translucent material to penetrate an image of the display.

Moreover, the front cover 505 may be a device to display an image. That is, the front cover 505 may display an image. In this case, the front cover 505 and the display may be implemented in a single hardware device.

The head unit 502 may be equipped with at least one hardware device or machine structure to be directed to where the user is during interaction with the user.

Specifically, the head unit 502 may include at least one sensor (e.g., a camera) for obtaining information from the user direction, and at least one output unit (e.g., a display) for outputting information to the user direction.

For example, the head unit 502 may be equipped with at least one camera module 513 for obtaining an image from a direction in which interaction with the user is performed, and at least one microphone 514 for obtaining audio. Furthermore, the head unit 502 may be equipped with at least one speaker 515 for outputting audio toward a direction in which interaction with the user is performed, a mechanical eye structure (not shown), and a display 512 for displaying an image. In addition, the direction in which the head unit 502 interacts with the user may be indicated by light or temporary mechanical change.

The head unit 502 may further include a communication module 220, a sensor module 240, and a camera module 291. The communication module may receive a message from an external electronic device or transmit a message to an external electronic device.

The sensor module may obtain information about a surrounding condition.

For example, the sensor module may sense approaching of the user to the electronic device 501. Specifically, the sensor module may sense the user's approach by sensing a body of the user. Alternatively, the sensor module may sense the user's approach based on a signal from another electronic device (e.g., a wearable device or a smart phone) used by the user. The sensor module may also sense the user's motion, position, etc.

The camera module may take a picture of a surrounding environment. In this case, the electronic device 501 may identify the user according to a result taken by the camera module.

The body unit 503 may have a hemispherical shape, and include a wireless power receiver and a battery. The electronic device 501 may charge a battery with wireless power from the cradle 601 through the wireless power receiver.

The body unit 503 may mechanically come into contact with the cradle 601 but may not include a terminal to electrically contact the cradle 601.

With the hemispherical shape of the body unit 503, the electronic device 501, when put on the cradle 601, may move up, down, to the left, or to the right, or in all directions, like a human joint. In other words, when put on the cradle 601, the electronic device 501 may be moved such that the head unit 502 is directed toward various directions in three dimensional (3D) space.

The cradle 601 may include a stand 602 and a plurality of operation legs 603.

The stand 602 may have a circular form without being limited thereto. For example, the stand 602 may have a triangular or rectangular form, or any polygonal form.

The cradle 601 may include at least three operation legs 603, 604, and 605 arranged on the top face of the stand 602.

The three operation legs 603, 604, and 605 may be radially arranged from the center of the stand 603 to be equidistant from one another. For example, the first, second, and third operation legs 603, 604, and 605 may be arranged at regular intervals.

While the electronic device 501 is put on the cradle 601, the body unit 503 of the electronic device 501 may come into contact with the plurality of operation legs 603, 604, 605. The respective operation legs 603, 604, 605 may be rotated by motors, and may include a plurality of wheels 611, 612, 613.

The plurality of wheels may be in contact with the body unit 503 of the electronic device 601, enabling the electronic device 501 to move easily. In other words, the plurality of wheels may serve as bearings to make the electronic device move smoothly when the electronic device is moved according to rotation of the plurality of legs 603, 604, 605.

In addition, the plurality of wheels may directly receive torque from the motor and enable the electronic device to move by the torque. In other words, as the wheels rotate, the electronic device is able to move.

Furthermore, the wheels may be formed of a material, such as rubber or silicon, without being limited thereto, and a material having a property of maintaining frictional force may be used to form the wheels.

As such, because the body unit 503 of the electronic device 501 has a hemispherical form and the operation legs 603, 604, 605 that come into contact with the body unit 503 of the electronic device 601 are arranged equidistantly, the head unit 502 of the electronic device 501 may be directed to a desired direction in 3D space, reliably and promptly.

Furthermore, because the body unit 503 of the electronic device 501 has a hemispherical form and the operation legs 603, 604, 605 that come into contact with the body unit 503 of the electronic device 501 are arranged equidistantly, simply putting the electronic device 501 on the cradle 601 without considering the direction or position may enable the electronic device 501 and the cradle 601 to be functionally combined. Here, 'being functionally combined' refers to two physically separate objects are combined to be able to function like a single product.

The cradle 601 may include a wireless power transmitter (not shown), which may transmit wireless power to the electronic device 501 put on the cradle 601 to charge a battery included in the electronic device 501.

Figure 2:
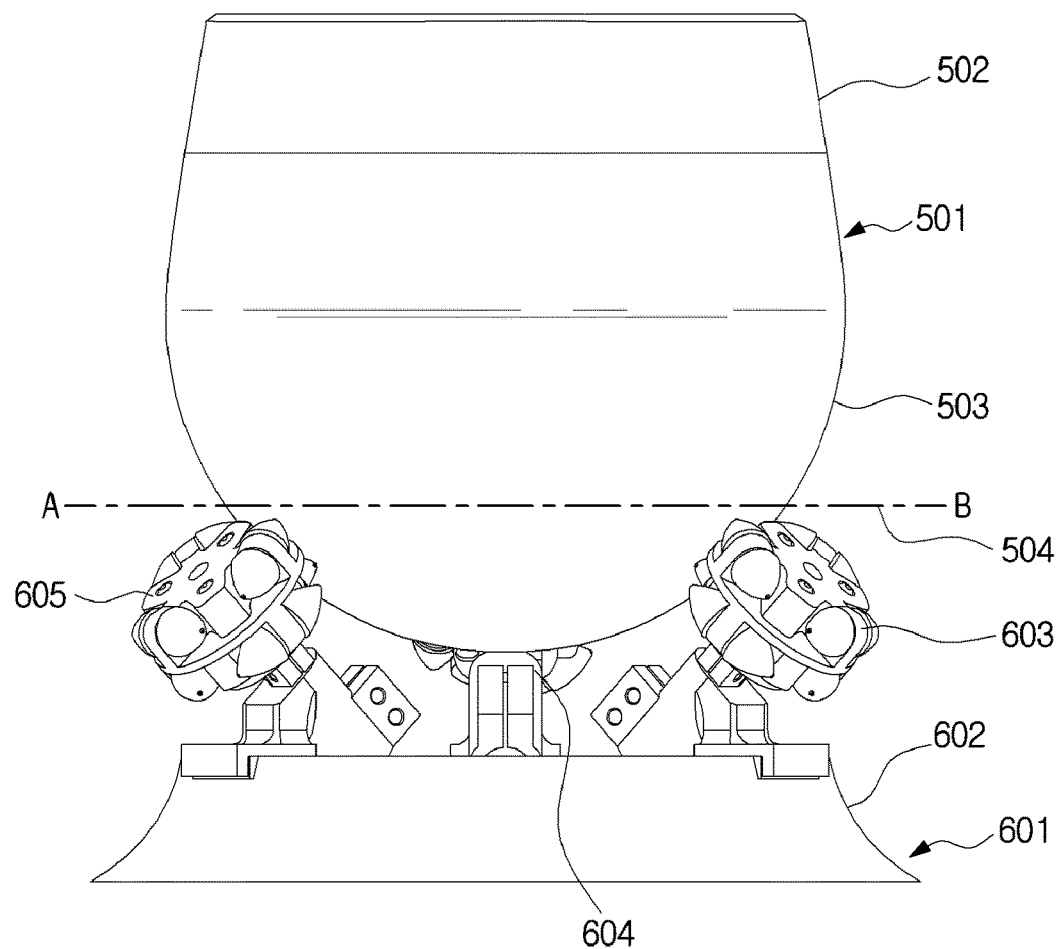
FIG. 2 is a side view of an electronic device put on a cradle, according to an embodiment of the present disclosure.

FIG. 2 is a side view of an electronic device put on a cradle, according to an embodiment of the present disclosure.

Referring to FIG. 2, the electronic device 501 and the cradle 601 are shown. The electronic device 501 may be put on the cradle 601 such that the front cover faces up, as shown in FIG. 2.

The body unit 503 of the electronic device 501 comes into contact with the operation legs 603, 604, 605 of the cradle 601, and may move in a desired direction with the torque transferred from the plurality of wheels included in the operation legs.

The operation legs 603, 604, 605 may be arranged to keep a predetermined angle with the top face of the stand 602. In order to stably support the body unit 503, the angle formed between the operation legs 603, 604, 605 and the top face of the stand 602 may be less than 90 degrees.

Furthermore, in a case where the electronic device 501 is vertically put on the cradle 601, contacts between the body unit 503 of the electronic device 501 and the operation legs 603, 604, 605 may be located in the middle of the hemispherical face AB 504 of the body unit 503 or below.

If an antenna of the wireless power receiver included in the body unit 503 of the electronic device 501 is arranged in a bottom part of the hemispherical body unit 503, putting the electronic device 501 vertically on the cradle 601 may increase the charging efficiency. Moreover, if the antenna of the wireless power receiver is arranged at an arbitrary location on the hemispherical body unit 503, the electronic device 501 may control a driver of the cradle 601 to adjust the orientation of the electronic device 501 for increasing the charging efficiency.

Figure 3:
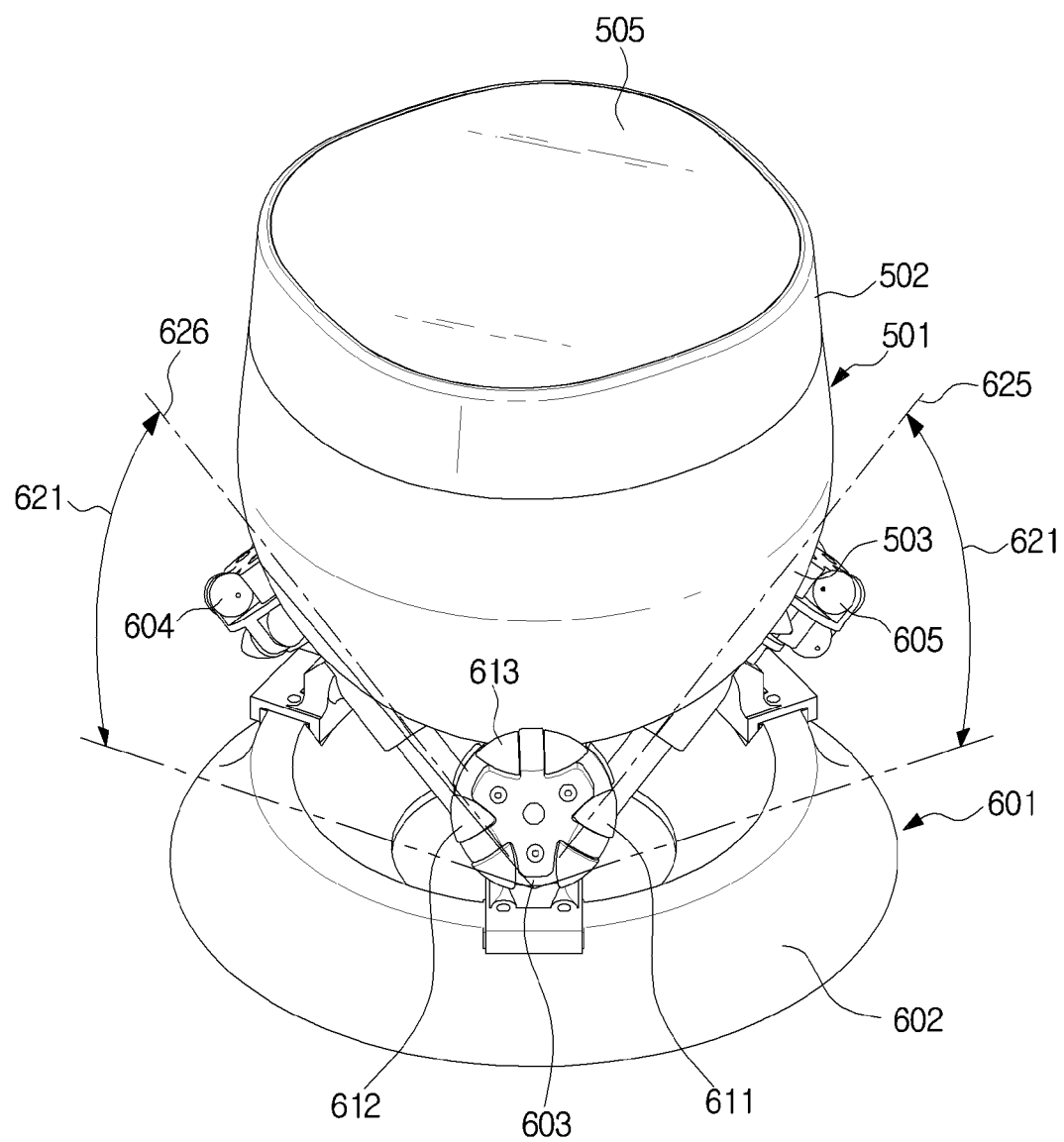
FIG. 3 is a perspective view of an electronic device put on a cradle, according to an embodiment of the present disclosure.

FIG. 3 is a perspective view of an electronic device put on a cradle, according to an embodiment of the present disclosure.

Referring to FIG. 3, the electronic device 501 and the cradle 601 are shown.

The head unit 502 of the electronic device 501 may include the front cover 505. The body unit 503 of the electronic device 501 may include a hemispherical face.

The electronic device 501 may be separated from the cradle 601, and the user may carry the electronic device 501 only.

The cradle may have the plurality of operation legs 603, 604, 605 to move the electronic device 501.

The plurality of operation legs 603, 604, 605 may be radially arranged from the center of the stand 602 to support the hemispherical face of the electronic device 501, and may be mounted on the stand 602 to be inclined at a predetermined angle from the floor. Although in this embodiment, three operation legs are illustrated as an example, there may be three or more operation legs built onto the stand 602.

The operation legs 603, 604, 605 may be equidistant from each other to stably support the hemispherical face of the electronic device 501. Specifically, a distance between the first operation leg 603 and the second operation leg 604 is the same as the distance between the second operation leg 604 and the third operation leg 605 and the distance between the third operation leg 605 and the first operation leg 603.

An angle 621 formed between the second operation leg 604 and the floor of the stand 602, an angle 621 formed between the third operation leg 605 and the floor of the stand 602, and an angle (not shown) formed between the first operation leg 603 and the floor of the stand 602 may be the same.

The respective operation legs 603, 604, 605 may include a plurality of wheels.

For example, the first operation leg 603 may have a plurality of wheels 611, 612, 613. Although in this embodiment, an operation leg, e.g., 603 has three wheels 611, 612, 613, it is possible for the operation leg to have more or fewer number of wheels.

In the case that the first operation leg 602 has three wheels 611, 612, 613, the wheels may be arranged at intervals of 120 degrees.

The operation legs 603, 604, 605 may rotate independently. For example, the third operation leg 605 may rotate clockwise or counterclockwise around a third rotation axis 625. The second operation leg 604 may rotate clockwise or counterclockwise around a second rotation axis 626. Likewise, the first operation leg 603 may rotate clockwise or counterclockwise around a first rotation axis 631 (see FIG. 7).

The respective rotation axes 631 (see FIG. 7), 626, 625 of the operation legs 603, 604, 605 may be perpendicular to rotation axes of the wheels 611, 612, 613. As the operation legs 603, 604, 605 and the wheels 611, 612, 613 rotate independently, the electronic device 501 may be rotated in any direction in the 3D space.

Figure 4:
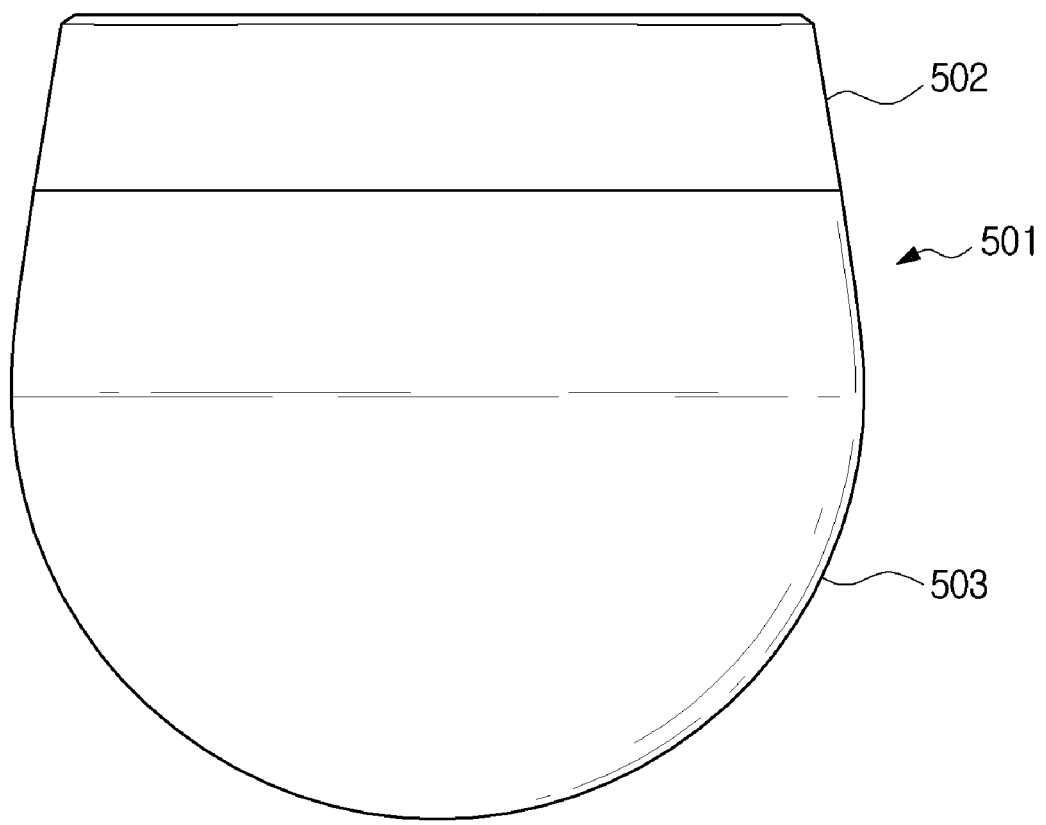
FIG. 4 is a side view of an electronic device, according to an embodiment of the present disclosure.

FIG. 4 is a side view of an electronic device, according to an embodiment of the present disclosure.

Referring to FIG. 4, the electronic device 501 may include the head unit 502 and the body unit 503. The body unit 503 may have a hemispherical form including a hemispherical face. Alternatively, the body unit 503 may include part of the hemispherical face. The circumference of the head unit 502 may be equal to or smaller than the circumference of the body unit 503.

Figure 5:
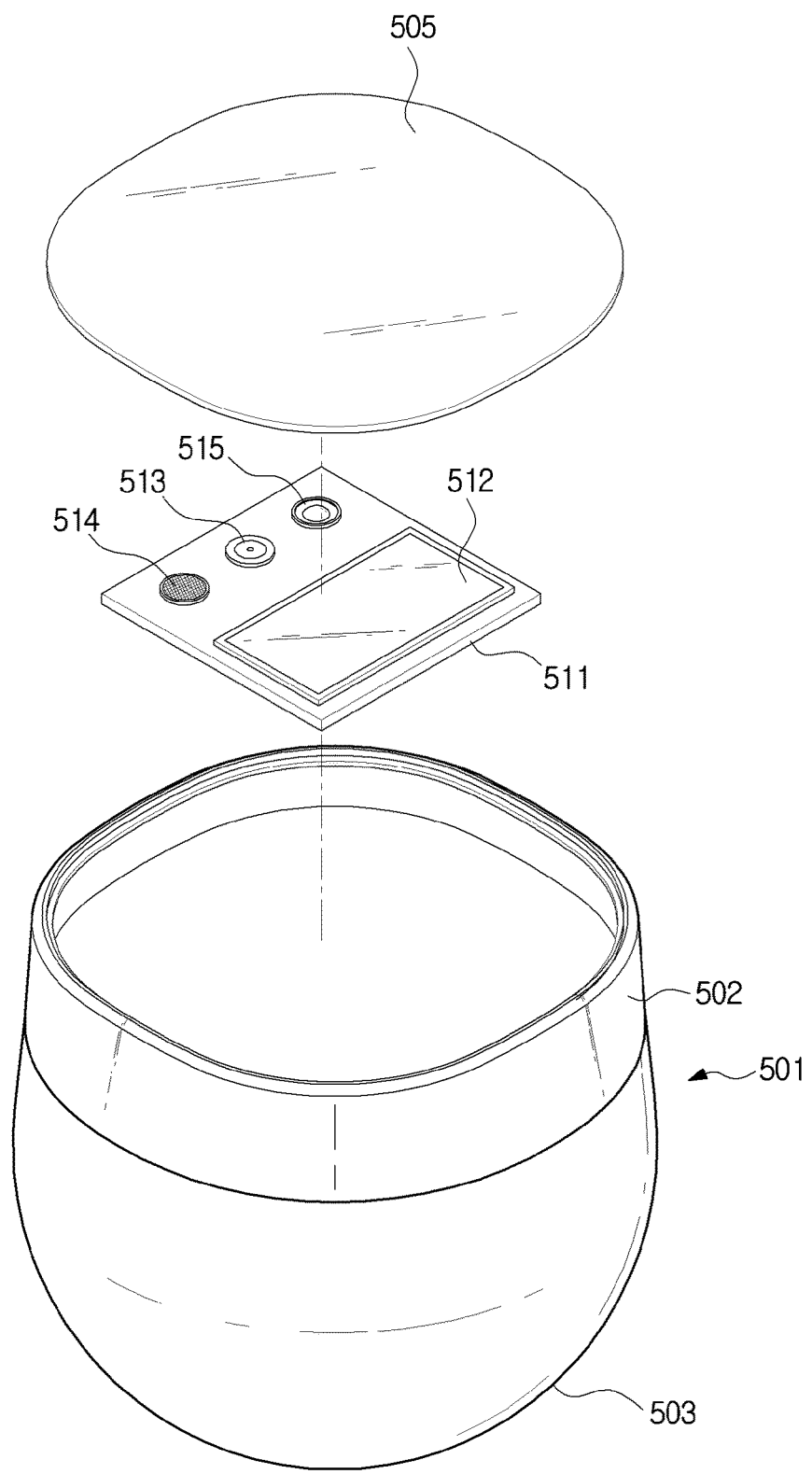
FIG. 5 is a perspective view of an electronic device, according to an embodiment of the present disclosure.

FIG. 5 is a perspective view of an electronic device, according to an embodiment of the present disclosure.

Referring to FIG. 5, the body unit 503 of the electronic device 501 may have the hemispherical form while the head unit 502 may have a rectangular form with round edges. Although in this embodiment, the head unit 502 is shown to have the rectangular form with round edges, the head unit 502 may have a circular form or any other polynomial form.

The head unit 502 may include the front cover 505, which may perform operation corresponding to a human face.

Various devices including a display may be arranged on the inner side of the front cover 505.

For example, on the inner side of the front cover 505, there may be a printed circuit board (PCB) 511 on which a display 512, a camera 513, a microphone 514, and a speaker 515 are mounted. That is, the display 512, the camera 513, the microphone 514, and the speaker 515 may be arranged on the same circuit board 511.

The circuit board 511 may be arranged in parallel with the front cover 505. Accordingly, the display 512 may also be arranged in parallel with the front cover 505, and may display various images. The images displayed on the display 512 may penetrate the front cover 505, and thus the user may be able to see the images through the front cover 505.

The camera 513 may be arranged on the circuit board 511 to be adjacent to the display 512, and a direction to which the camera 513 is directed to take a picture may be the same direction which the display 512 faces.

The microphone 514 may be arranged on the circuit board 511 to be adjacent to the display 512, and a direction from which the microphone 514 receives sound may be the same direction to which the camera is directed to take a picture and the direction which the display 512 faces.

The speaker 515 may be arranged on the circuit board 511 to be adjacent to the display 512, and a direction to which the speaker 515 outputs sound may be the same direction which the display 512 displays.

Figure 6:
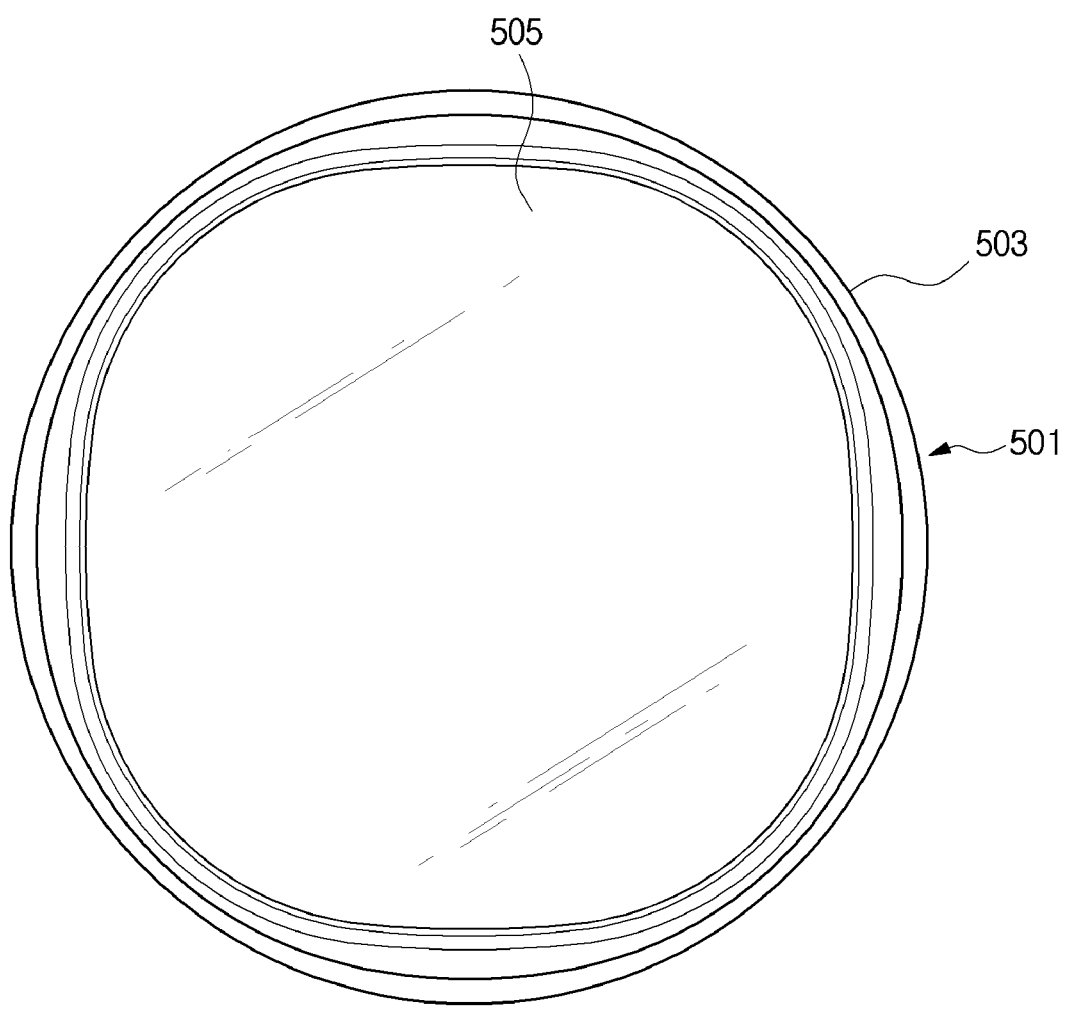
FIG. 6 is a top view of an electronic device, according to an embodiment of the present disclosure.

FIG. 6 is a top view of an electronic device, according to an embodiment of the present disclosure.

Referring to FIG. 6, the front cover 505 of the head unit 502 may have a rectangular form with round edges while a body unit 503 of the electronic device 501 may have a circular form. According to an embodiment of the present disclosure, the size of the front cover 505 may be smaller than the size of the body 503, without being limited thereto.

In an embodiment, the display of the electronic device 501 may be arranged on the inner side of the front cover 505, and the electronic device 501 may perform various interactions with the user through the display. In an embodiment, the front cover 505 may serve as the display by itself.

Figure 7:
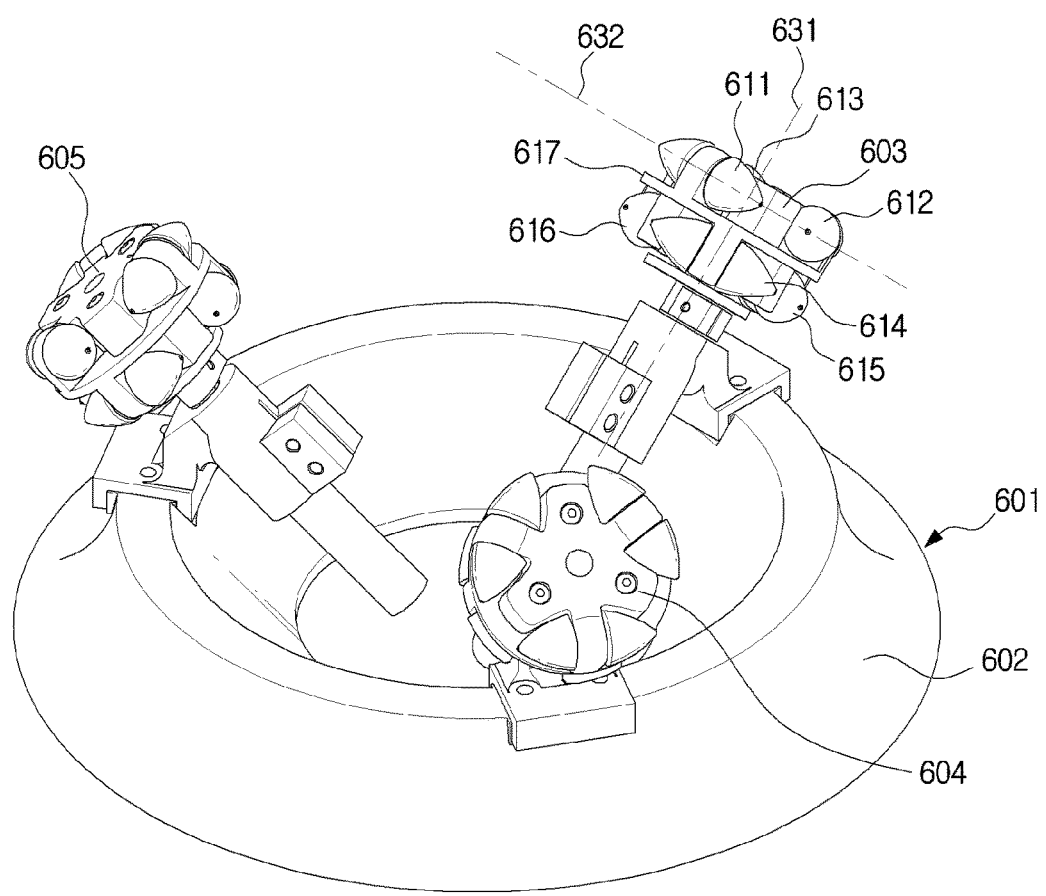
FIG. 7 illustrates a cradle, according to an embodiment of the present disclosure.

FIG. 7 illustrates a cradle, according to an embodiment of the present disclosure.

Referring to FIG. 7, the operation legs 603, 604, 605 may be arranged on the stand 602 of the cradle 601.

The operation legs 603, 604, 605 may be radially arranged from the center of the stand 602 at intervals of 120 degrees.

The respective operation legs 603, 604, 605 may rotate around respective main rotation axes. For example, the first operation leg 603 may rotate clockwise or counterclockwise around a main rotation axis 631, the second operation leg 604 may rotate clockwise or counterclockwise around a main rotation axis 626 (see. FIG. 3), and the third operation leg 605 may rotate clockwise or counterclockwise around a main rotation axis 625 (see. FIG. 3).

The respective operation legs 603, 604, 605 may include a plurality of wheels. For example, the first operation leg 603 may have a plurality of wheels 611, 612, 613, 614, 615, 616.

The plurality of wheels 611 to 616 of the first operation leg 603 may be divided into three upper wheels 611, 612, 613 and three lower wheels 614, 615, 616 with respect to a middle frame 617.

The middle frame 617 may rotate with the first operation leg 603 around the main axis 631.

The respective upper wheels 611, 612, 613 and the lower wheels 614, 615, 616 may rotate independently around their respective auxiliary rotation axes. For example, the upper wheel 611 of the first operation leg 603 may rotate around a secondary rotation axis 632.

In this regard, the main rotation axis of the operation leg 603, 604, 605 are perpendicular to the respective auxiliary rotation axes of the plurality of wheels. In other words, the respective operation legs 603, 604, 605 may rotate around their respective main rotation axes, and may include a plurality of wheels e.g., 611 to 616, which may rotate around the auxiliary rotation axes perpendicular to the main rotation axes of the operation legs 603, 604, 605.

Accordingly, the electronic device 501 supported by the operation legs 603, 604, 605 may be able to freely rotate in any direction in the 3D space.

The operation legs 603, 604, 605 may receive torque from motors. The operation legs 603, 604, 605 may change the position and/or orientation of the electronic device 501 according to the torque received from the motors.

The plurality of wheels 611 to 616 included in each of the operation legs 603, 604, 605 may rotate by the movement (changes in position and/or orientation) of the electronic device 501. That is, the plurality of wheels 611 to 616 may serve as bearings to enable the electronic device 501 to move easily by the operation legs 603, 604, 605.

In an embodiment, the cradle 601 may include motors to rotate the plurality of wheels e.g., 611 to 616, included in each of the operation legs 603, 604, 605.

Figure 8:
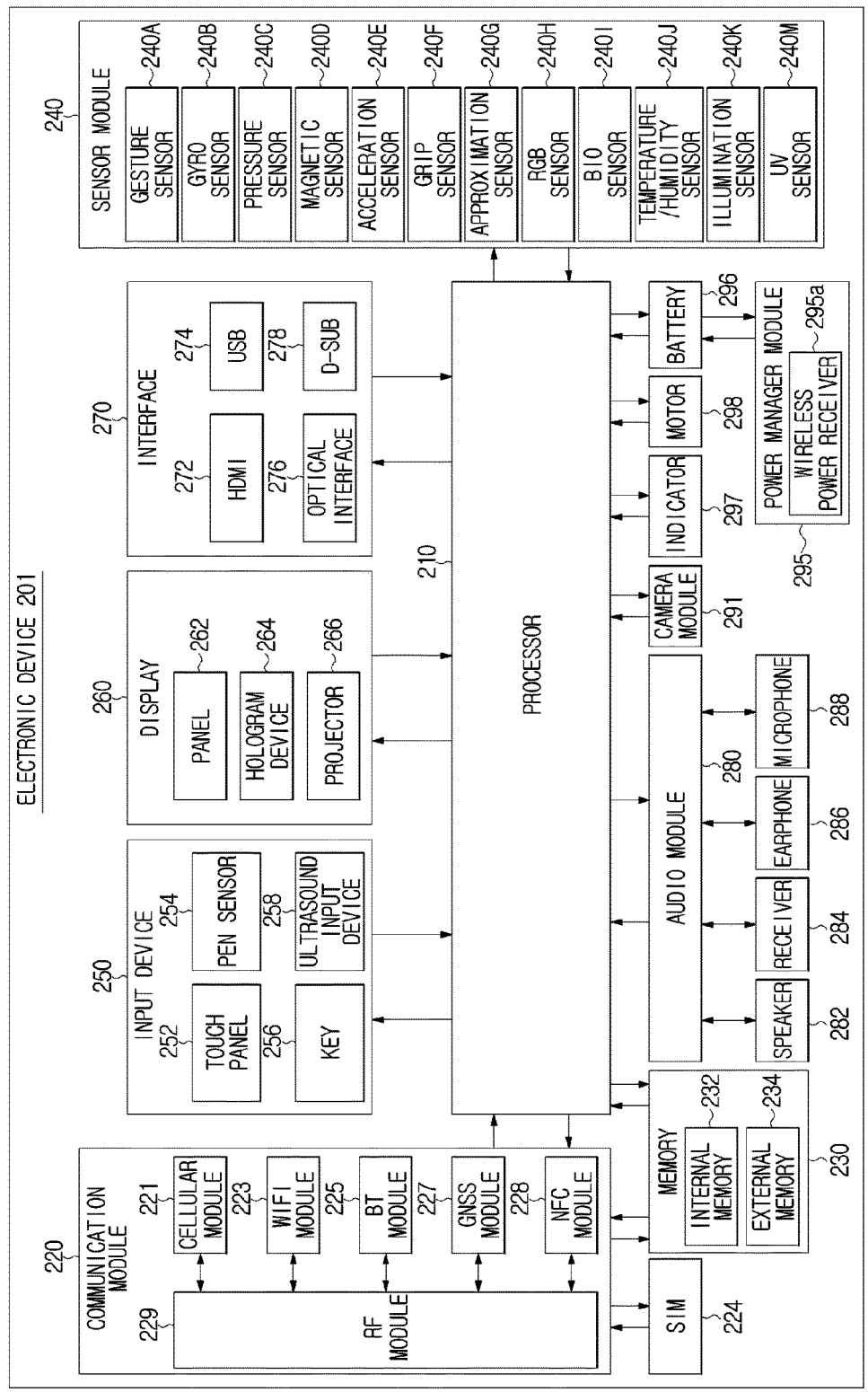
FIG. 8 is a block diagram of an electronic device, according to an embodiment of the present disclosure.

FIG. 8 is a block diagram of an electronic device, according to an embodiment of the present disclosure.

The electronic device 201 may include one or more processors (e.g., Application Processors (AP)) 210, a communication module 220, a Subscriber Identification Module (SIM) 224, a memory 230, a sensor module 240, an input device 250, a display 260, an interface 270, an audio module 280, a camera module 291, a power manager module 295, a battery 296, an indicator 297, and a motor 298. The processor 210 may control multiple hardware components connected to the processor 210 or software components stored in the memory 230 by running e.g., an operating system or application programs, and may perform data processing and operation.

The processor 210 may be implemented in e.g., a System on Chip (SoC).

In accordance with an embodiment, the processor 210 may further include a Graphic Processing Unit (GPU) and/or an image signal processor. In an embodiment, the processor 210 may also include at least some of the components shown in FIG. 8, e.g., a cellular module 221.

The processor 210 may load a command or data received from at least one of the other components, e.g., a nonvolatile memory, onto a volatile memory and then process the command or data, and store the processed data in the nonvolatile memory.

The processor 210 may determine a target orientation of the electronic device to be directed toward the user, and send out information about the current orientation of the electronic device and information about the target orientation of the electronic device.

If the user is identified in an image obtained by the camera module 291, the processor 210 may determine the target orientation of the electronic device such that the user is located in the center of the image obtained by the camera module 291.

The processor 210 may send out the information about the current orientation of the electronic device and the information about the target orientation of the electronic device through the communication module 220.

Once the user is identified in an image obtained by the camera module 291, the processor 210 may create control data to change the orientation of the electronic device such that the user is located in the center of the image obtained by the camera module 291. Specifically, the processor 210 may obtain information about a current orientation of the electronic device through a gyro sensor, determine a target orientation of the electronic device from an image obtained through the camera module 291, and change the orientation of the electronic device by calculating a difference between the target orientation and the current orientation.

The processor 210 may change the orientation of the electronic device in a predetermined range if the user is not identified in the image obtained through the camera module 220. For example, the processor 210 may send control data to change the orientation of the electronic device to the cradle through the communication module 220 such that the orientation of the electronic device is changed within a range from +30 to −30 degrees in all directions with respect to the current orientation of the electronic device, obtain an image through the camera, and determine whether the user exists in the obtained image.

The processor 210 may determine a target orientation of the electronic device based on a direction from which the voice input to the microphone is produced. The direction from which the voice is produced may be where there is the user. For example, the processor 210 may analyze the voice input through the microphone to identify where the user is located. Specifically, the processor 210 may identify a voice signal corresponding to the user from the voice input through the microphone, and determine a target orientation of the electronic device such that the voice signal corresponding to the user is maximized in volume. Furthermore, the processor 210 may estimate a direction from which the voice is produced based on the volume of the voice signal received by a plurality of microphones (e.g., a microphone array), and determine a target orientation such that the electronic device is directed to the direction from which the voice is produced.

The processor 210 may determine that the electronic device is put on the cradle based on information sensed by the sensor module 240. For example, the processor 210 may determine whether the electronic device is put on the cradle based on data output from the approximation sensor.

The communication module 220 may transmit or receive data to or from e.g., an external device. The communication module 220 may send out information about the orientation of the electronic device and the information about the target orientation of the electronic device. The communication module 220 may also send out control data created by the processor 210 to change the orientation of the electronic device.

The communication module 220 may send out information about speed and/or acceleration of the motion of the electronic device.

The communication module 220 may include a cellular module 221, a Wi-Fi module 223, a Bluetooth module 225, a GNSS module 227 (e.g., GPS module, Glonass module, Beidou module, or Galileo module), a Near Field Communication (NFC) module 228, and a Radio Frequency (RF) module 229.

The cellular module 221 may provide e.g., voice calls, video calls, texting, and/or Internet services over a communication network.

In an embodiment, the cellular module 221 may also identify and authenticate the electronic device 201 in the communication network using the SIM 224, e.g., a SIM card. In accordance with an embodiment, the cellular module 221 may perform at least some of the functions that the AP 210 may provide. In an embodiment, the cellular module 221 may include a Communication Processor (CP).

The Wi-Fi module 223, the Bluetooth module 225, the GNSS module 227, and the NFC module 228 may each include a processor for processing data sent or received through the corresponding module. In an embodiment, at least some (e.g., two or more) of the cellular module 221, the Wi-Fi module 223, the Bluetooth module 225, the GNSS module 227, and the NFC module 228 may be integrated in a single Integrated Chip (IC) or an IC package.

The RF module 229 may transmit and/or receive communication signals, e.g., RF signals. In an embodiment, the RF module 229 may exchange communications with e.g., the cellular module 221, the Wi-Fi module 223, the Bluetooth module 225, the GNSS module 227, and the NFC module 228.

The RF module 229 may include e.g., a transceiver, a Power Amp Module (PAM), a frequency filter, a Low Noise Amplifier (LNA), or an antenna.

In an embodiment, at least one of the cellular module 221, the Wi-Fi module 223, the Bluetooth module 225, the GNSS module 227, and the NFC module 228 may transmit and/or receive RF signals through a separate RF module.

The SIM 224 may include a card including a SIM and/or an embedded SIM, and include unique identification information, e.g., an Integrated Circuit Card Identifier (ICCID) or an International Mobile Subscriber Identity (IMSI).

The memory 230 may include e.g., an internal memory 232 or an external memory 234.

The internal memory 232 may include e.g., at least one of a volatile memory, such as Dynamic Random Access Memory (DRAM), Static RAM (SRAM), Synchronous Dynamic RAM (SDRAM), or the like, a non-volatile memory, such as One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, NOR flash memory, or the like, a hard driver, and a Solid State Driver (SSD).

The external memory 234 may further include a flash drive, such as compact flash (CF), secure digital (SD), micro secure digital (Micro-SD), mini secure digital (Mini-SD), extreme digital (xD), multimedia card (MMC), memory stick, or the like. The external memory 234 may be operationally and/or physically connected to the electronic device 201 through various interfaces.

The sensor module 240 may measure e.g., a physical quantity or sense an operation state or orientation of the electronic device 201, and convert the measured or sensed information to an electric signal. The sensor module 240 may also detect speed and/or acceleration of the motion of the electronic device.

The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H such as an RGB (Red, Green, Blue) sensor, a bio sensor 240I, a temperature/humidity sensor 240J, an illumination sensor 240K, and an Ultra Violet (UV) sensor 240M.

The gyro sensor 240B may detect information about rotating motion (e.g., angular velocity), and the acceleration sensor 240E may detect information about the orientation (e.g., the slope) of the electronic device and information about linear motion (e.g., linear acceleration). The current orientation of the electronic device may be determined based on outputs from the gyro sensor 240B and the acceleration sensor 240E.

The processor 210 may send out the information about the orientation of the electronic device received from the sensor module 240 through the communication module 220.

Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, a finger print sensor, or the like.

The sensor module 240 may include at least one sensor and a control circuit for controlling the sensor. In some embodiments, the electronic device 201 may further include a processor configured to control the sensor module 240 as a part of the processor 210 or separately from the processor 210, and the processor 210 may control the sensor module 240 while in the sleep state.

The input device 250 may include e.g., a touch panel 252, a (digital) pen sensor 254, a key 256, or an ultrasonic input device 258.

The touch panel 252 may employ at least one of a capacitive, resistive, infrared, and ultrasonic method. The touch panel 252 may further include a control circuit. In an embodiment, the touch panel 252 may further include a tactile layer for providing the user with haptic sensation.

The (digital) pen sensor 254 may be e.g., a part of the touch panel 252, or include a separate sheet for recognition. The key 256 may include e.g., a physical button, optical key or key pad. The ultrasonic input device 258 may detect ultrasound originated from an input tool through a microphone (e.g., microphone 288) to determine data corresponding to the detected ultrasound.

The display 260 may display various contents (e.g., text, images, video, icons, symbols or the like) for the user, and include a panel 262, a hologram device 264, or a projector 266.

The panel 262 may include e.g., a Liquid Crystal Display (LCD), a Light Emitting Diode (LED) display, an organic LED (OLED) display, Micro-Electromechanical System (MEMS) display, or an electronic paper display.

The panel 262 may be implemented to be flexible, transparent, or wearable.

In an embodiment, the panel 262 may include a touch screen, which may detect touches, gestures, proximity or hovering inputs by way of an electronic pen or a part of the user's body. In an embodiment, the panel 262 may also be incorporated with the touch panel 252 in a single module.

The hologram device 264 may make three dimensional (3D) images (holograms) in the air by using light interference. The projector 266 may display an image by projecting light onto a screen. The screen may be, for example, located inside or outside of the electronic device 201.

In accordance with an embodiment, the display 260 may further include a control circuit to control the panel 262, the hologram device 264, or the projector 266.

The interface 270 may include e.g., a High Definition Multimedia Interface (HDMI) 272, a Universal Serial Bus (USB) 274, an optical interface 276, or a D-subminiature (D-sub) 278.

Additionally or alternatively, the interface 270 may include e.g., a Mobile High-definition Link (MHL) interface, a secure digital (SD) card/multimedia card (MMC) interface, or Infrared Data Association (IrDA) standard interface.

The audio module 280 may convert between sound and electric signals. The audio module 280 may process sound information input or output through e.g., a speaker 282, a receiver 284, an earphone 286, or a microphone 288.

The microphone 288 may receive a voice from the user to produce an electronic signal. In an embodiment, the microphone 288 may include at least one of a directional microphone and a microphone-array.

The camera module 291 may capture e.g., a still image and a moving image. In an embodiment, the camera module 291 may include one or more image sensors (e.g., a front sensor or a back sensor), a lens, an image signal processor (ISP), or a flash (e.g., an LED or a xenon lamp).

The camera module 291 may take a picture of an object, including the user, to create image data. In an embodiment, the camera module 291 may obtain an image in a direction that the display faces.

The power manager module 295 may manage power of e.g., the electronic device 201.

The power manager module 295 may include an antenna to receive power transmitted from the cradle, and wirelessly charge the battery in a wireless charging scheme. The wireless charging scheme may include e.g., a magnetic resonance scheme, a magnetic induction scheme, or an electromagnetic wave based scheme, and the power manager module 295 may further include an additional circuit, such as a coil loop, a resonance circuit, a rectifier, or the like for wireless charging.

The power manager module 295 may include a wireless power receiver 295*a* for receiving wireless power from a wireless power transmitter of the cradle to charge the battery of the electronic device.

The wireless power receiver 295*a* may receive wireless power using at least one wireless power transfer method.

For example, the wireless power receiver 295*a* may receive power in a magnetic induction based inductive coupling scheme. The inductive coupling scheme refers to power reception performed by magnetic field that changes in one coil inducing current in another coil by magnetic induction.

Alternatively, the wireless power receiver 295*a* may receive power in a resonant coupling scheme based on an electromagnetic resonance phenomenon due to a wireless power signal of a particular frequency. In the resonant coupling scheme, resonance occurs in the wireless power receiver due to a wireless power signal transmitted from the wireless power transmitter, and power is transferred from the wireless power transmitter to the wireless power receiver through the resonance.

When the electronic device 201 is put on the cradle, the wireless power receiver 295*a* may receive a pulse signal transmitted from the cradle. Specifically, the antenna of the wireless power receiver 295*a* may receive a pulse signal transmitted from the cradle at constant time intervals, and request the cradle to transmit wireless power. At the request for transmitting wireless power, the cradle may transmit wireless power and the electronic device 201 may receive the wireless power.

The battery 296 may include, e.g., a rechargeable battery and/or a solar battery.

The indicator 297 may indicate an operation state of the electronic device 201 or a part of the electronic device (e.g., the processor 210), e.g., a booting state, a message state, or charging state.

The motor 298 may convert an electric signal to mechanical vibration, and produce vibration or haptic effects.

Although not shown, a processing unit for supporting a mobile TV, such as a Graphic Processing Unit (GPU) may be included in the electronic device 201. The processing unit for supporting a mobile TV may process media data conforming to a standard, such as Digital Multimedia Broadcasting (DMB), Digital Video Broadcasting (DVB), or mediaFLo™.

Figure 9:
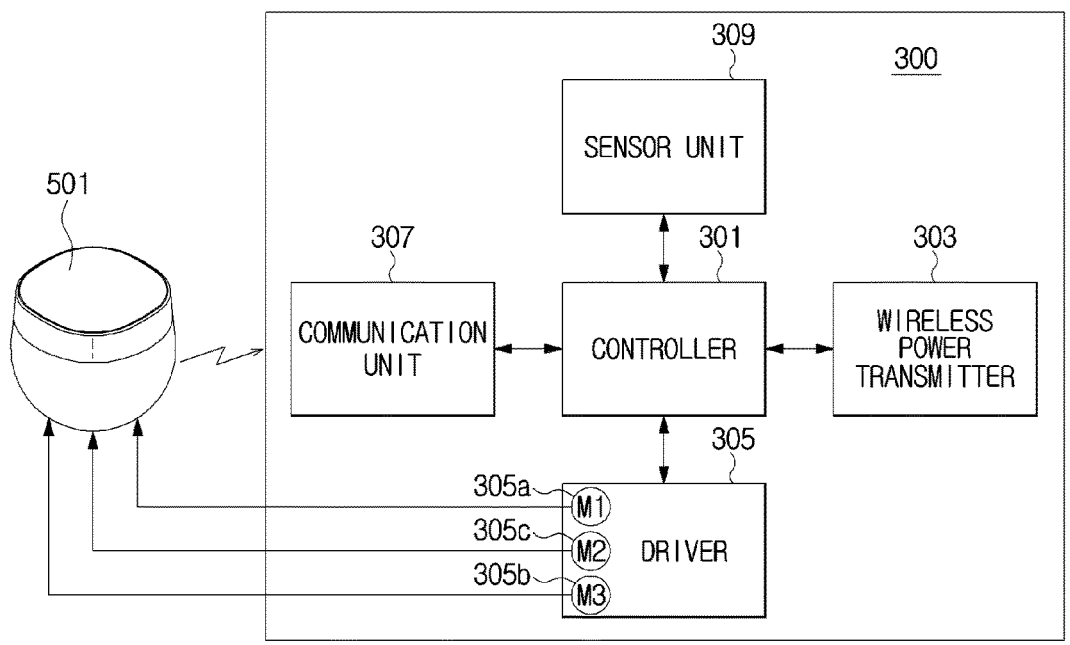
FIG. 9 is a block diagram of a cradle for an electronic device, according to an embodiment of the present disclosure.

FIG. 9 is a block diagram of a cradle for an electronic device, according to an embodiment of the present disclosure.

The cradle 300 may include a controller 301, wireless power transmitter 303, a driver 305, a communication unit 307, and a sensor unit 309.

The communication unit 307 may wirelessly exchange data with an electronic device. Specifically, the communication unit 307 may communicate with the electronic device based on at least one communication standard or protocol such as Wi-Fi, Zigbee, Bluetooth, LTE, 3G, IR, etc. The communication unit 307 may receive information about the orientation and information about a target orientation of the electronic device from the electronic device.

The wireless communication may include e.g., cellular communication. The cellular communication may include at least one of e.g., Long-Term Evolution (LTE), LTE-Advanced (LTE-A), Code Divisional Multiplexing Access (CDMA), Wideband CDMA (WCDMA), Universal Mobile Telecommunications System (UMTS), Wireless Broadband (WiBro), Global System for Mobile Communications (GSM), etc.

The wireless communication may also include short-range communication. The short-range communication may include at least one of e.g., Wi-Fi, Bluetooth, NFC, etc.

The wireless communication may include the GNSS. The GNSS may include at least one of e.g. Global Positioning System (GPS), Global Navigation Satellite System (Glonass), and Beidou Navigation Satellite System (Galileo, the European global satellite-based navigation system).

The wireless power transmitter 303 may include an antenna to transmit wireless power to the electronic device. The wireless power transmitter 303 may transmit a pulse signal at constant time intervals and receive response signals to the pulse signal from the electronic device.

The driver 305 may include a driving circuit for supplying driving current to the motors 305*a*, 305*b* and 305*c* to rotate the operation legs. The operation legs may be rotationally arranged on the stand. There may be at least one motor for one operation leg. For example, the driver 305 may include three motors 305*a*, 305*b*, and 305*c* to drive the respective operation legs. The respective operation legs may physically come into contact with the surface of the electronic device 501 and change the orientation of the electronic device.

For example, the motors may rotate the operation legs. The driver 305 may include a total of three motors 305*a*, 305*b*, and 305*c* for three operation legs.

The driving circuit may supply driving current to the plurality of motors 305*a*, 305*b*, and 305*c* according to control signals (e.g., signals about rotating direction and speed of the motor) from the controller 301.

The driving circuit may include switch devices, inverter circuits, etc., for controlling driving current to be supplied to the plurality of motors. A single driving circuit may supply driving currents to all of the plurality of motors 305*a*, 305*b*, and 305*c*, or a plurality of driving circuits may supply driving currents to the respective motors 305*a*, 305*b*, and 305*c*.

The driver 305 may control the rotation direction, rotation speed, and rotation torque of the respective motors 305*a*, 305*b*, and 305*c* based on data sent from the controller 301.

The controller 301 may control general operation of the cradle 300.

The controller 301 may control the rotation direction and speed of motors included in the driver 305 based on data received from the electronic device through the communication unit 307. Specifically, the controller 301 may receive information about the orientation and information about a target orientation of the electronic device through the communication unit 307, and create control data to change the orientation of the electronic device to the target orientation. The controller 301 may control the driver 305 to change the orientation of the electronic device based on the control data. The controller 301 may change the orientation of the electronic device until the electronic device takes the target orientation.

The controller 301 may control the driver 305 based on previously received information about an orientation of the electronic device, if no information about the orientation of the electronic device is received from the electronic device. The controller 301 may make changes to the orientation of the electronic device until the electronic device is oriented in the final target orientation, while receiving feedback from the electronic device. Because the information about the orientation of the electronic device is wirelessly transmitted from the electronic device, a situation where noise interferes the information about the orientation of the electronic device from being received from the electronic device may occur. In this case, the controller 301 of the cradle may predict a next orientation of the electronic device using the previously received information about the orientation of the electronic device, and drive the motors using the predicted orientation information to change the orientation of the electronic device.

In an embodiment, the electronic device may create and send control data to control the driver 305 to the cradle 300. In this case, the controller 301 of the cradle 300 may control the driver 305 using the control data received from the electronic device and change the orientation of the electronic device.

Furthermore, the controller 301 may transmit power to the electronic device through the wireless power transmitter 303 when the electronic device is put on the cradle 300. The controller 301 may control the wireless power transmitter 303 to transmit power to the electronic device based on a response signal to the pulse signal received from the electronic device through the wireless power transmitter 303.

The controller 301 may include a processor, a memory, etc. The processor may include an Arithmetic and Logic Unit (ALU) for performing computation to process data, and a memory circuit for storing data to be computed or computed data.

The memory may include volatile memories, such as Static Random Access Memories (S-RAMs), Dynamic RAMs (D-RAMs), or the like, and non-volatile memories, such as Read Only Memories (ROMs), Erasable Programmable ROMs (EPROMs), Electrically Erasable Programmable ROMs (EEPROMs), or the like.

The processor and the memory may be implemented in separate chips, or in a single chip, such as a system on chip (SoC).

The sensor unit 309 may include e.g., an approximation sensor or a contact sensor. If the electronic device is put on the cradle 300, the sensor unit 309 may detect this, and output a signal accordingly. The controller 301 may then receive the signal and may know that the electronic device is put on the cradle 300.

The sensor unit 309 may detect if the electronic device is put on the cradle 300 in various ways.

For example, the sensor unit 309 may include a capacity sensor to detect a change in capacity due to the electronic device. When the electronic device is put on the cradle 300, the capacity sensor may detect a change in capacity due to the electronic device and output a signal accordingly, and the controller 301 may receive the signal and determine that the electronic device is put on the cradle 300.

Alternatively, the sensor unit 309 may include a hall sensor to detect a magnetic field from a magnet of the electronic device. When the electronic device is put on the cradle 300, the hall sensor may detect a magnetic field produced from the magnet of the electronic device and output a signal accordingly, and the controller 309 may receive the signal and determine that the electronic device is put on the cradle 300.

Furthermore, the controller 301 may transmit power to the electronic device through the wireless power transmitter 303 based on a signal output from the sensor unit 309.

Figure 10A:
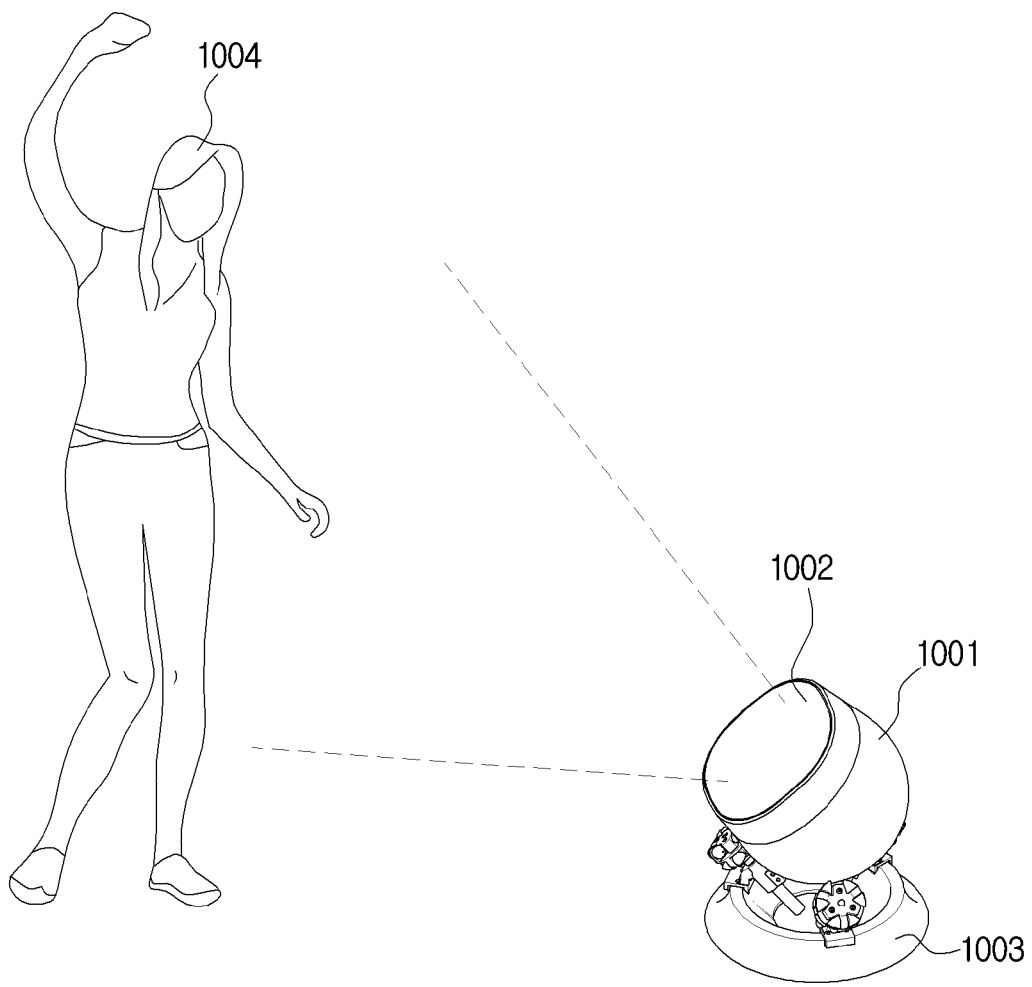
FIGS. 10A and 10B show examples of an electronic device, according to an embodiment of the present disclosure.
Figure 10B:
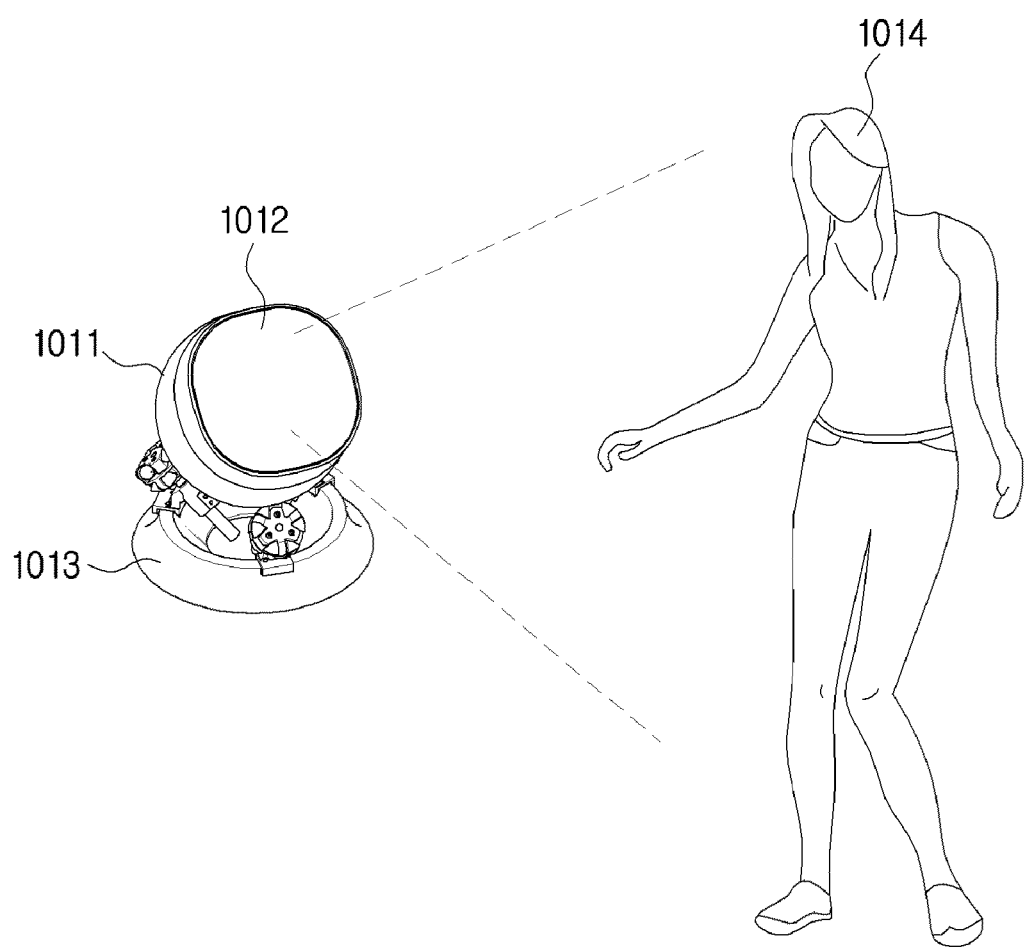

FIGS. 10A and 10B show examples of an electronic device, according to an embodiment of the present disclosure.

Referring to FIG. 10A, an electronic device 1001, a cradle 1003, and a user 1004 are shown.

The user 1004 is located to the left of the electronic device 1001, and a front cover 1002 faces the user 1004. Specifically, the front cover 1002 may be directed to be oriented toward the face of the user 1004.

The electronic device 1001 may identify the user 1004, and control the driver of the cradle 1003 to change the orientation of the electronic device 1001 such that the display on the inner side of the front cover 1002 faces the user 1004. Specifically, the electronic device 1001 may control the driver of the cradle 1003 to change the orientation of the electronic device 1001 such that the display on the inner side of the front cover 1002 is directed to the face of the user 1004.

If the user 1004 moves, the electronic device 1001 may change its orientation by tracking the user. Specifically, the electronic device 1001 may change its orientation by controlling the driver of the cradle 1003 such that the display is directed to the face of the user 1004.

Referring to FIG. 10B, an electronic device 1011, a cradle 1013, and a user 1014 are shown.

As the user 1014 moves from left to right of the electronic device 1011, the electronic device 1011 may change its orientation such that the front cover 1012 is directed from the left to the right by tracking the user 1014.

A display and a camera module may be arranged on the inner side of the front cover 1012. An image captured by the camera may be sent to the processor, which may then analyze the image to identify the position of the user and control the driver of the cradle 1013 to change the orientation of the electronic device such that the display faces the user.

Figure 11:
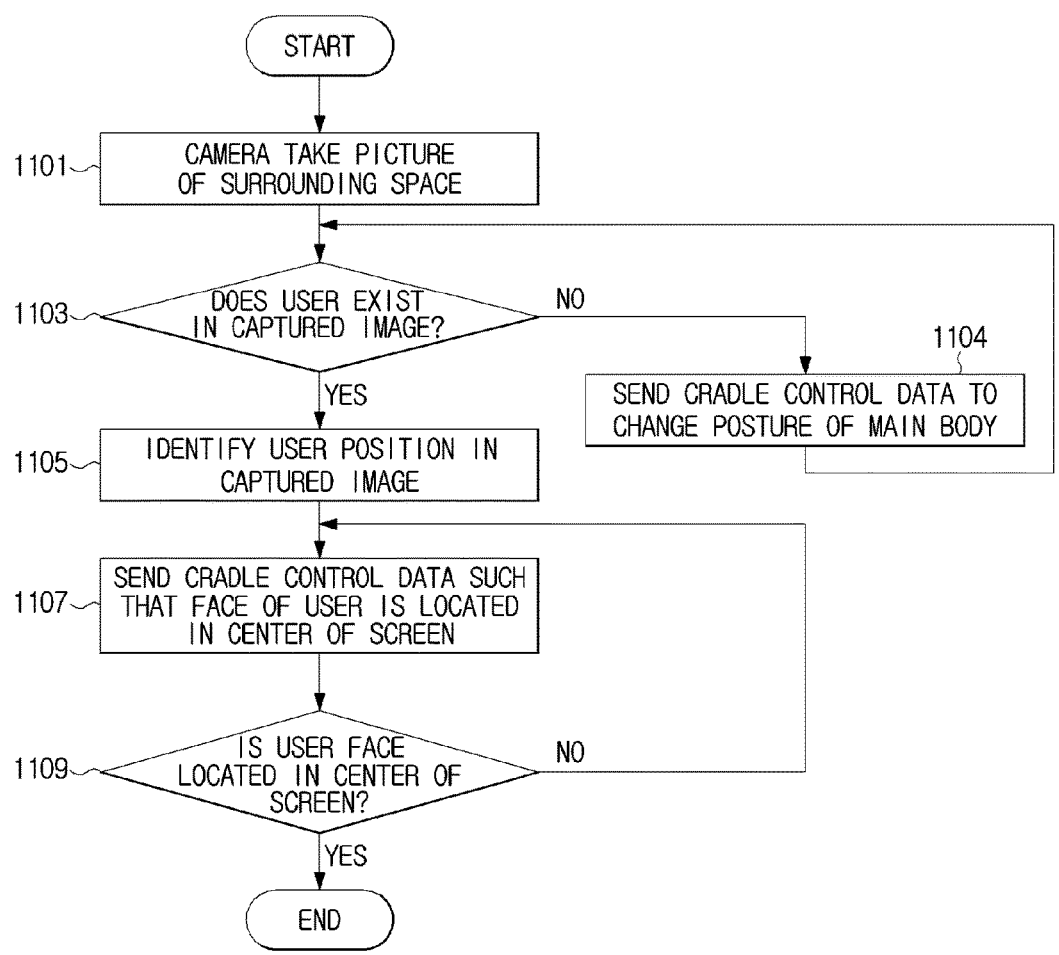
FIG. 11 is a flowchart illustrating a process to drive an electronic device, according to an embodiment of the present disclosure.
Figure 12A:
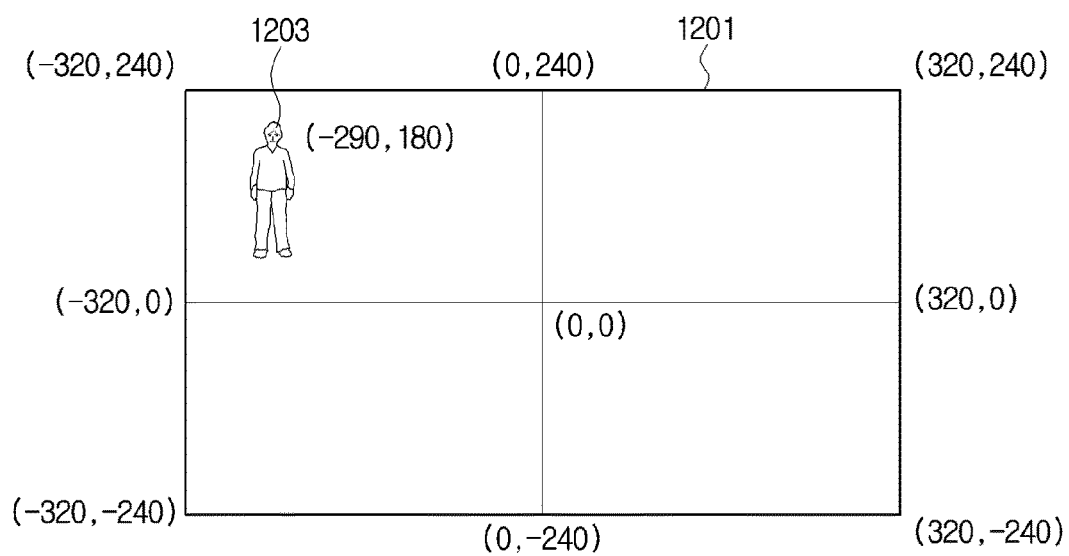
FIGS. 12A and 12B show examples of an image including a user obtained by an electronic device, according to an embodiment of the present disclosure.
Figure 12B:
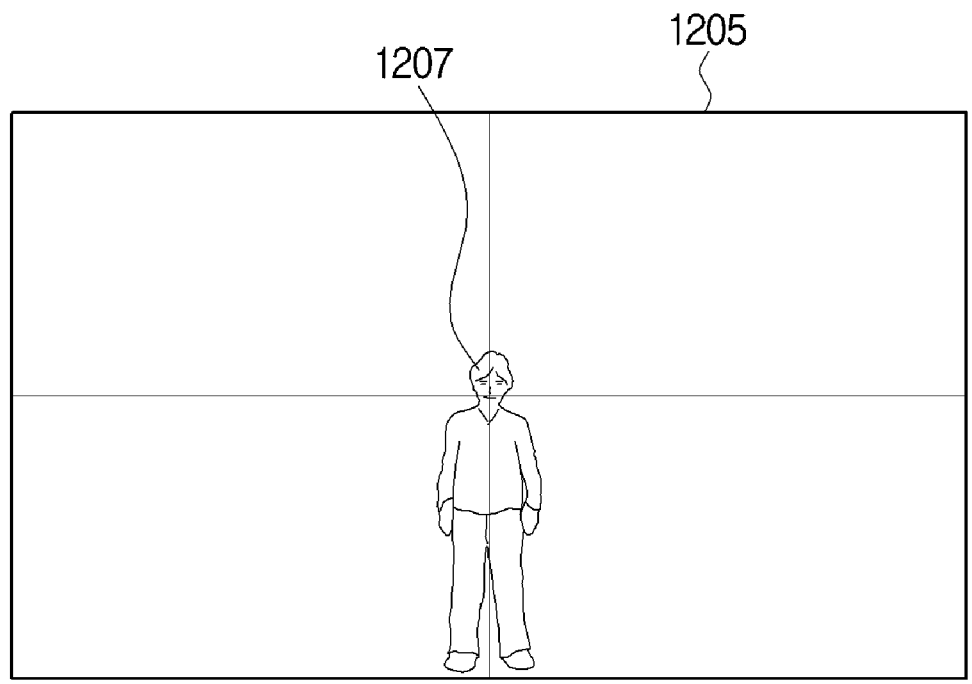

FIG. 11 is a flowchart illustrating a process to drive an electronic device, according to an embodiment of the present disclosure. FIGS. 12A and 12B show examples of an image including a user obtained by an electronic device, according to an embodiment of the present disclosure.

Referring to FIG. 11, a camera of the electronic device captures surrounding space, in operation 1101. The camera may send the captured image to the processor. The processor may identify the user by performing image recognition on the image sent from the camera.

In operation 1103, the processor may determine whether there is a user in the captured image. The processor may process the captured image, and identify whether the user exists in the image.

If there is no user in the captured image, the processor may send control data to the cradle to change the orientation of the electronic device, in operation 1104.

Specifically, the processor may send control data to the cradle to control the driver of the cradle to change the orientation of the electronic device within a predetermined range. The processor may process and send the control data to the communication module in the format conforming to a predetermined protocol of the communication module, and the communication module may then forward the control data to the cradle according to the protocol.

For example, the processor may process the control data to conform to the Bluetooth protocol, and send the control data through the communication unit in the Bluetooth communication scheme. Furthermore, the processor may process the control data to conform to the Wi-Fi protocol, and send the control data through the communication unit in the Wi-Fi communication scheme.

If the user exists in the captured image, the processor may identify the position of the user in the captured image, in operation 1105.

Specifically, the processor may determine where the user is located in the captured image.

For example, the processor may set the center of the image to a reference point in a coordinate system, and determine the position of the user in the coordinate system based on the reference point.

Referring to FIG. 12A, for example, the processor may set the center of the image 1201 to the coordinates (0, 0), the upper left corner of the image to the coordinates (−320, 240), the upper right corner to (320, 240), the lower left corner to (−320, −240), and the lower right corner to (320, −240). The processor may process the image to determine coordinates of the position of the user 1203. In the image, the coordinates of the position of the user correspond to (−290, 180).

In operation 1107, the processor may send control data to the cradle such that the face of the user is located in the center of the image.

Specifically, the processor may determine the coordinates of the position of the user based on the coordinates of the center of the image, calculate data to control the driver of the cradle based on a distance from the position of the user to the center of the image, and send the calculated control data to the cradle.

In an embodiment, the processor may send information about the current orientation and information about a target orientation of the electronic device to the cradle through the communication unit. In this case, the control data to control the driver of the cradle is created by the controller of the cradle.

For example, referring to FIG. 12A, the position of the user may be away from the center of the captured image as far as a distance of (−290, 180). The processor may create control data corresponding to the distance and wirelessly transmit the control data to the cradle through the communication module. The cradle may change the orientation of the electronic device based on the control data transmitted from the electronic device by controlling motors of the driver such that the face of the user is located in the center of the captured image.

In operation 1109, the processor may determine whether the face of the user is located in the center of the captured image. If the face of the user 1207 is located in the center of the captured image 1205 (e.g. see FIG. 12B), the processor may stop operation of the motors of the driver of the cradle. If the face of the user is not located in the center of the captured image, the processor may repeatedly perform operations 1107 and 1109.

Figure 13:
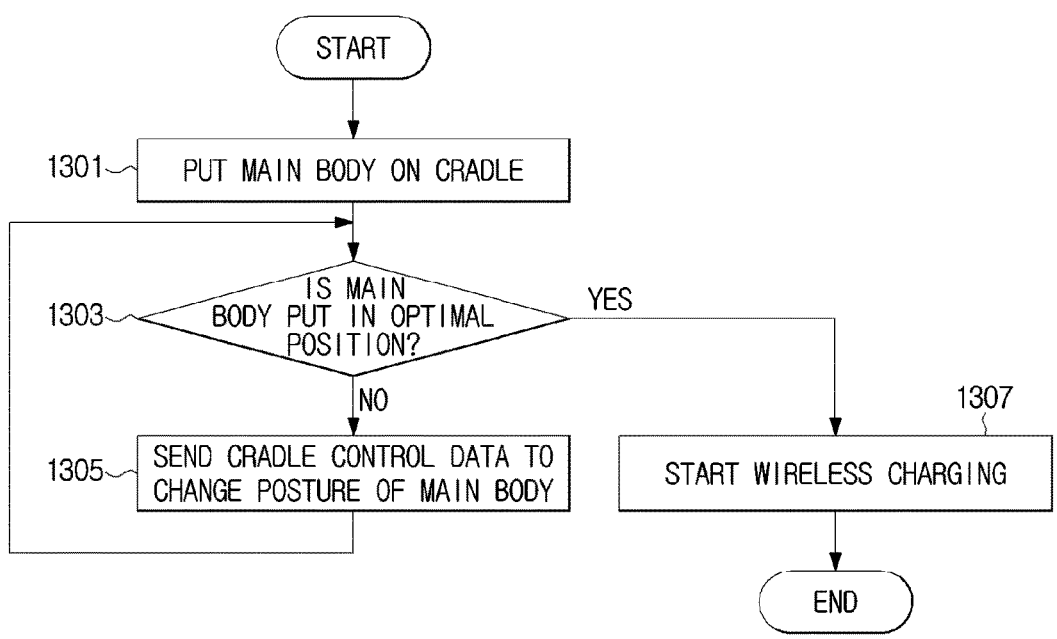
FIG. 13 is a flowchart illustrating how to start wireless charging when an electronic device is put on a cradle.

FIG. 13 is a flowchart illustrating how to start wireless charging when an electronic device is put on a cradle.

The electronic device may include a wireless power receiver for wireless charging the battery.

The wireless power receiver may receive power in an inductive coupling scheme based on magnetic induction. The inductive coupling scheme refers to power reception performed by magnetic field that changes in one coil inducing current in another coil by magnetic induction.

Alternatively, the wireless power receiver may receive power in a resonant coupling scheme. In the resonant coupling scheme, resonance occurs in the wireless power receiver due to a wireless power signal transmitted from the wireless power transmitter, and power is transferred from the wireless power transmitter to the wireless power receiver by the resonance.

A position of a transmit coil of the cradle to transmit power and a position of a receive coil of the electronic device to receive power are important to increase a wireless charging efficiency, and the wireless charging efficiency may increase when the transmit and receive coils are in optimal positions.

The electronic device may transmit control data to the cradle to change the orientation of the electronic device in order to increase the wireless charging efficiency. In other words, the electronic device may transmit control data to the cradle to change the orientation of the electronic device based on the wireless charging efficiency.

In operation 1301, the processor may detect that the electronic device is put on the cradle.

If the electronic device is put on the cradle, an approximation sensor of the sensor module outputs a detection signal. The processor may detect that the electronic device is put on the cradle based on the detection signal output from the sensor module.

Specifically, when the electronic device is put on the cradle, the approximation sensor included in the cradle detects this and outputs a detection signal, and the controller of the cradle may receive the detection signal and determine that the electronic device is put on the cradle, and may send data to the electronic device. The electronic device may receive the data from the cradle and determine that the electronic device is put on the cradle.

Alternatively, when the electronic device is put on the cradle, the hall sensor included in the cradle detects this and outputs a detection signal, and the controller of the cradle may receive the detection signal and determine that the electronic device is put on the cradle, and may send data to the electronic device. The electronic device may receive the data from the cradle and determine that the electronic device is put on the cradle. The hall sensor may detect whether the electronic device is put on the cradle by detecting a magnetic field produced from a magnet included in the electronic device.

The wireless power transmitter included in the cradle may output a pulse signal before transmitting power. If the electronic device is put on the cradle, the electronic device receives the pulse signal and outputs a response signal in response to reception of the pulse signal. Upon reception of the pulse signal, the electronic device may determine that the electronic device is put on the cradle.

In operation 1303, the electronic device may determine whether it is put on the cradle in an optimal position. The optimal position herein may refer to a position in which the electronic device has the highest wireless charging efficiency.

The processor may change the orientation of the electronic device to increase the wireless charging efficiency. That is, the processor may change the orientation of the electronic device based on the wireless charging efficiency.

If the electronic device is not in the optimal position in operation 1303, the processor may send the cradle control data to change the orientation of the electronic device to increase the wireless charging efficiency in operation 1305, and the cradle may then control the motors of the driver based on the control data to change the orientation of the electronic device.

On the other hand, if it is determined in operation 1303 that the electronic device is the optimal position, the processor may start wireless charging in operation 1307.

Figure 14:
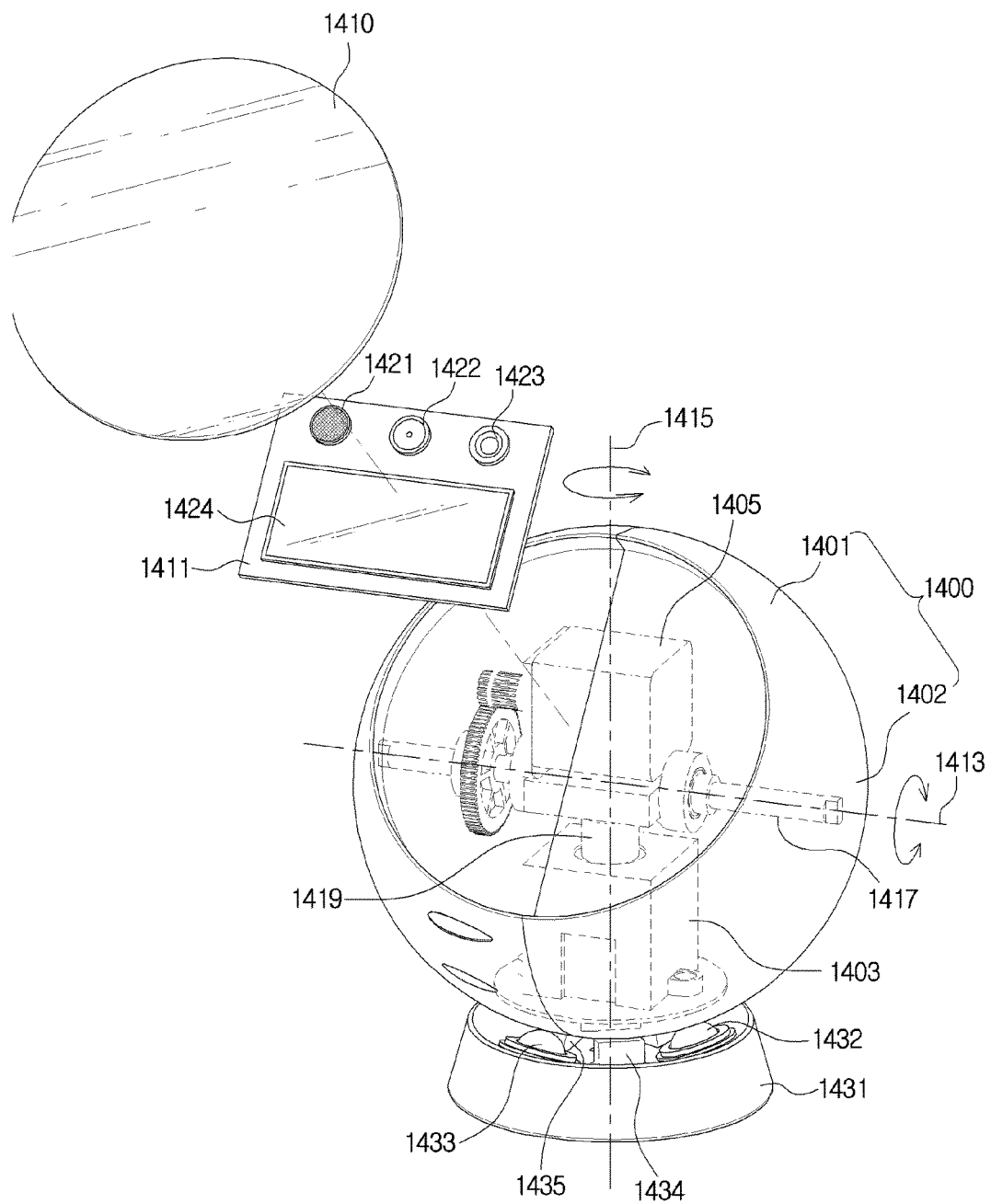
FIG. 14 shows an electronic device put on a cradle, according to an embodiment of the present disclosure.

FIG. 14 shows an electronic device put on a cradle, according to an embodiment of the present disclosure.

Referring to FIG. 14, an electronic device 1400 and a cradle 1431 are shown.

The electronic device 1400 may include a head unit 1401 and a body unit 1402. The head unit 1401 may be arranged on the top of the body unit 1402. The head unit 1401 may include a front cover 1410 to correspond to a person's facial form.

An image may be displayed on the front cover 1410 of the electronic device 1400, and for this, the electronic device 1400 may include a display 1424 arranged in a position corresponding to the front cover 1410.

For example, the display 1424 may be arranged on the inner side of the front cover 1410 of the electronic device 1400, and the front cover 1410 may be formed of a transparent or translucent material to transmit the displayed image.

Moreover, the front cover 1410 may be a device to display an image. That is, the front cover 1410 may display an image. In this case, the front cover and the display may be implemented in a single hardware unit.

In the head unit 1401, at least one hardware device or mechanical structure may be arranged to be directed toward the user during interaction with the user. The hardware device may be arranged on a circuit board 1411.

Specifically, the head unit 1401 may include at least one sensor (e.g., a camera) for obtaining information from the user direction, and at least one output unit (e.g., a display) for outputting information to the user direction.

For example, in the head unit 1401, there may be at least one camera module 1422 for obtaining an image from a direction in which interaction with the user is performed, and at least one microphone 1421 for obtaining audio. Furthermore, in the head unit 1401, at least one speaker 1423 for outputting audio toward a direction in which interaction with the user is performed, a mechanical eye structure, and a display 1424 for displaying an image are arranged. In addition, the direction in which the head unit 1401 interacts with the user may be indicated by the light or temporary structural change.

The head unit 1401 may further include a communication module, a sensor module, and a camera module. The communication module may receive a message from an external electronic device or transmit a message to an external electronic device.

The sensor module may obtain information about a surrounding condition.

For example, the sensor module may sense approaching of the user to the electronic device 1400. Specifically, the sensor module may sense the user's approach by sensing a body of the user. Alternatively, the sensor module may sense the user's approach based on a signal from another electronic device (e.g., a wearable device) used by the user. The sensor module may also sense the user's motion, position, etc. Furthermore, the sensor module may sense approaching of the cradle.

The camera module may take a picture of a surrounding environment. In this case, the electronic device may identify the user according to a result taken by the camera module.

Specifically, on the inner side of the front cover 1410, there may be a printed circuit board (PCB) 1411 on which a display 1424, a camera 1422, a microphone 1421, and a speaker 1423 are mounted. That is, the display 1424, the camera 1422, the microphone 1421, and the speaker 1423 may be arranged on the same circuit board 1411.

The circuit board 1411 may be arranged in parallel with the front cover 1410. Accordingly, the display 1424 may also be arranged in parallel with the front cover 1410, and may display various images. The images displayed on the display 1424 may be transmitted through the front cover 1410, and thus the user may be able to see the images through the front cover 1410.

The camera 1422 may be arranged on the circuit board 1411 to be adjacent to the display 1424, and a direction to which the camera 1422 is directed to take a picture may be the same direction in which the display 1424 displays.

The microphone 1421 may be arranged on the circuit board 1411 to be adjacent to the display 1424, and a direction from which the microphone 1421 receives sound may be the same direction to which the camera 1422 is directed to take a picture and the direction which the display 1424 faces.

The speaker 1423 may be arranged on the circuit board 1411 to be adjacent to the display 1424, and a direction to which the speaker 1423 outputs sound may be the same direction which the display 1424 faces.

The body unit 1402 may have a hemispherical form, and include a wireless power receiver and a battery. The electronic device 1400 may charge the battery with wireless power received from the cradle 1431 through the wireless power receiver. Inside the body unit 1402, a first motor 1403 and a second motor 1405 may be arranged. The first motor 1403 may drive a first shaft 1419, which may rotate around a first axis 1415. The second motor 1405 may drive a second shaft 1417, which may rotate around a second axis 1413. The first and second axes 1415 and 1413 may be perpendicular to each other.

The body unit 1402 may mechanically come into contact with the cradle 1431 but may not include a terminal to electrically contact the cradle 1431.

Because the body unit 1402 has the hemispherical form, the electronic device 1400, when put on the cradle 1431, may move in all directions, like a human joint. In other words, when put on the cradle 1431, the electronic device 1400 may be moved such that the head unit 1401 is directed toward various directions in 3D space.

The cradle 1431 may include a plurality of balls 1432, 1433, and a plurality of magnets 1434, 1435. The balls 1432, 1433 may be formed of a material, such as rubber or silicon, without being limited thereto, and a material having a property of maintaining frictional force may be used to form the balls 1432, 1433. The balls 1432, 1433 may physically contact the outer surface (of the body unit) of the electronic device 1400.

The cradle 1431 may have a circular form, without being limited thereto. For example, the cradle 1431 may have a triangular or rectangular form, or any polygonal form. The top face of the cradle 1431 may be concavely formed to receive the body unit 1401 of the electronic device 1400.

Figure 15:
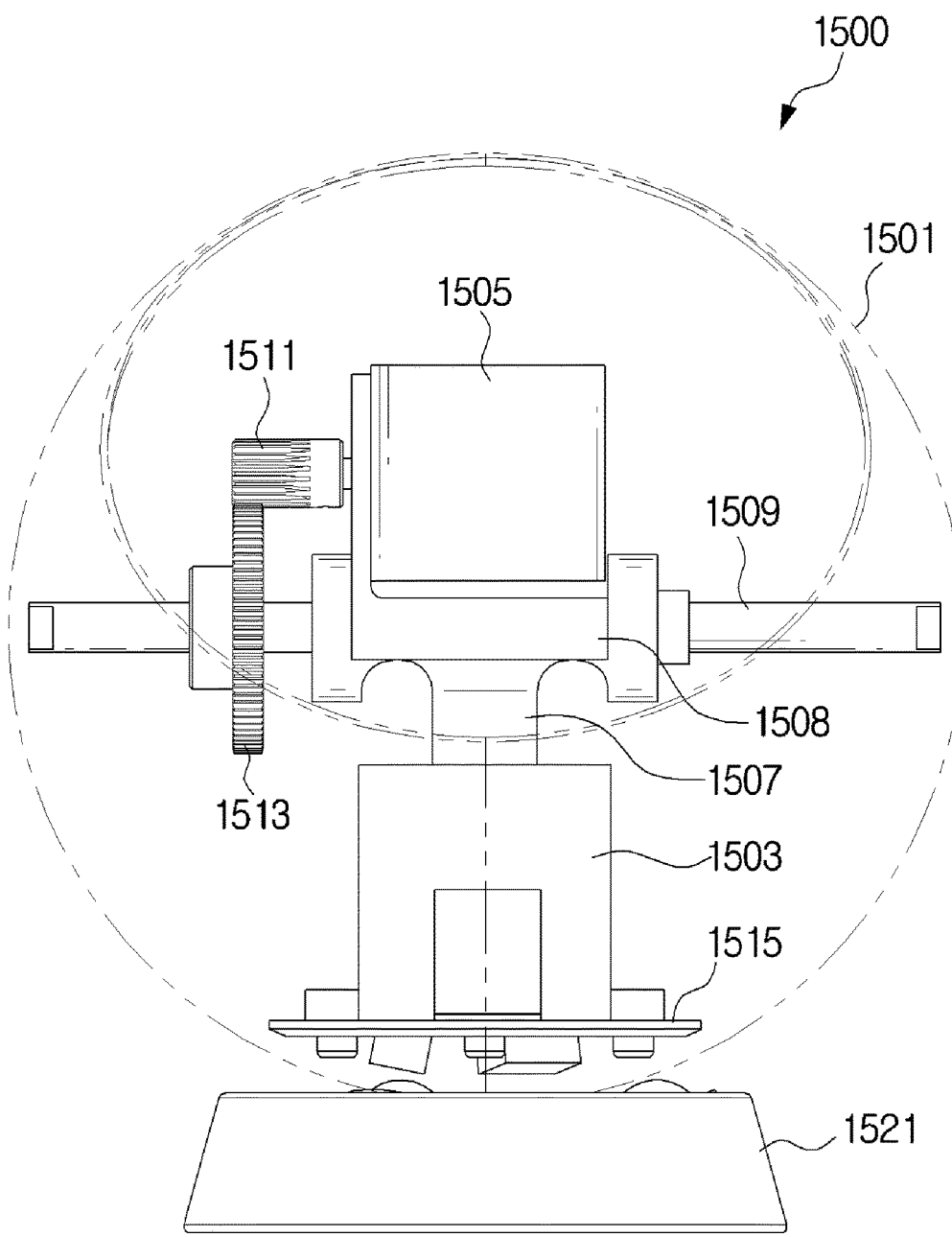
FIG. 15 is a front view of an electronic device put on a cradle, according to an embodiment of the present disclosure.

FIG. 15 is a front view of an electronic device put on a cradle, according to an embodiment of the present disclosure.

Referring to FIG. 15, an electronic device 1500 and a cradle 1521 are shown. Inside of a housing 1501 of the electronic device 1500, a first pedestal 1515, a second pedestal 1508, a first motor 1503, a second motor 1505, a first shaft 1507, and a second shaft 1509 may be arranged.

The first motor 1503 may be installed on the first pedestal 1515. The first pedestal 1515 may not be fixed onto the housing 1501 of the electronic device 1500. The first motor 1503 may not be fixed onto the housing 1501 of the electronic device 1500.

As a result, the first pedestal 1515 and the first motor 1503 may be moved independently from the movement of the housing 1501. For example, even if the housing 1501 rotates, the first pedestal 1515 and the first motor 1503 may keep their orientation without movement.

The first motor 1503 may be connected to the first shaft 1507. The first motor 1503 may drive the first shaft 1507.

The first shaft 1507 may be equipped with the second pedestal 1508, and the second motor 1505 may be installed on the second pedestal 1508.

As a result, the first shaft 1507 may be rotated by the rotation of the first motor 1503, and as the first shaft 1507 is rotated, the second pedestal 1508 may be rotated. Furthermore, as the second pedestal 1508 is rotated, the second motor 1505 installed on the second pedestal 1508 may be rotated.

The shaft of the second motor 1505 is equipped with a first gear 1511, and the second shaft 1509 is equipped with a second gear 1513. The first and second gears 1511 and 1513 may be in gear, and the torque of the second motor 1505 may be transferred to the second shaft 1509.

Both ends of the second shaft 1509 may be connected to the housing 1501 of the electronic device 1500, and the housing 1501 may be rotated according to the rotation of the second shaft 1509.

As the second shaft 1507 is equipped on the second pedestal 1508, the second shaft 1509 is rotated by the rotation of the first motor 1503, and accordingly, the housing 1501 of the electronic device 1500 may be rotated.

As described above, rotation of the first motor 1503 may be transferred to the housing 1501 of the electronic device 1500 via the first shaft 1507, the second pedestal 1508, the second motor 1505, and the second shaft 1509. In other words, the housing 1501 of the electronic device 1500 may be rotated around the first shaft 1507 according to the rotation of the first motor 1503.

Furthermore, rotation of the second motor 1505 may be transferred to the housing 1501 of the electronic device 1500 via the second shaft 1509. In other words, the housing 1501 of the electronic device 1500 may be rotated around the second shaft 1509 according to the rotation of the second motor 1505.

The first and second shafts 1507 and 1509 may be perpendicular to each other. For example, the first shaft 1507 may be perpendicular to the ground and the second shaft 1509 may be parallel to the ground. As a result, the housing 1501 may be rotated around an axis perpendicular to the ground by the rotation of the first motor 1503, and the housing 1501 may be rotated around an axis parallel to the ground by the rotation of the second motor 1505.

Figure 16:
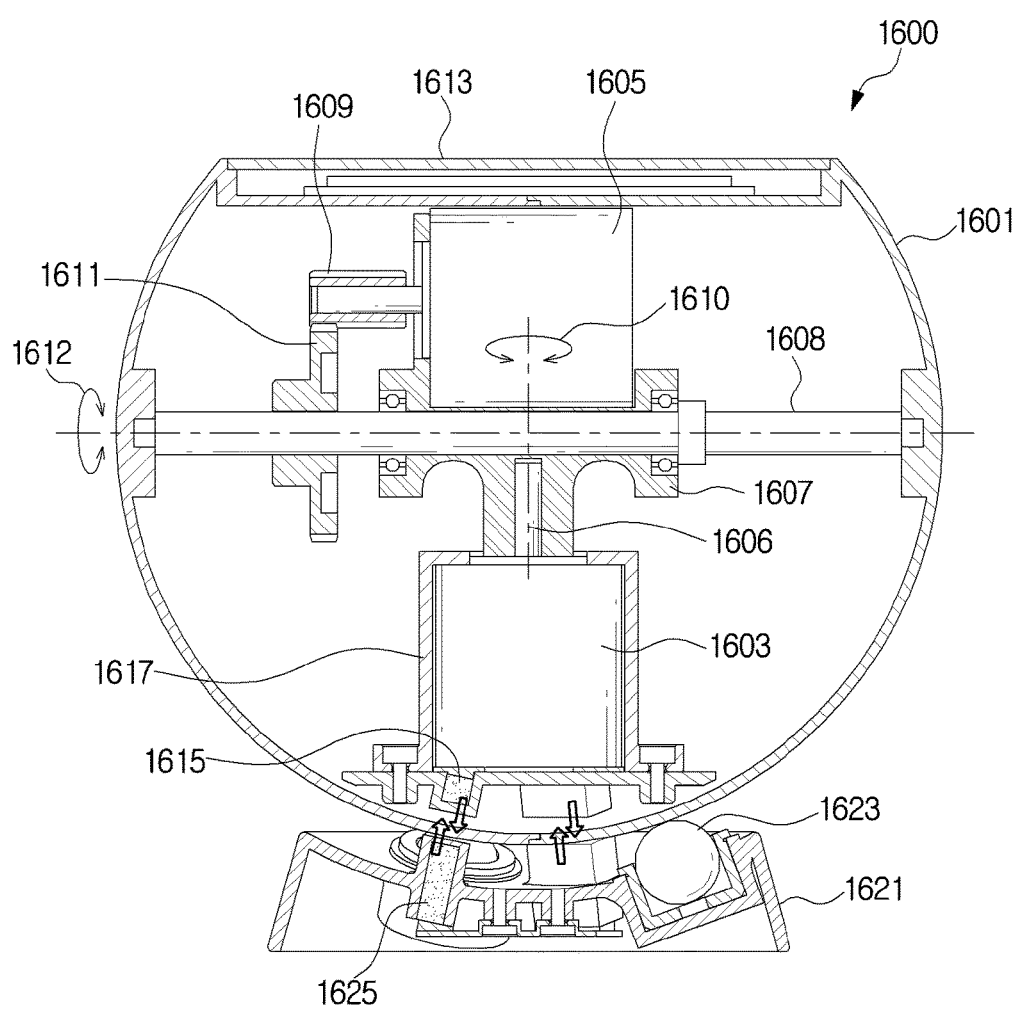
FIG. 16 is a cross-sectional view of an electronic device and cradle therefore, according to an embodiment of the present disclosure.

FIG. 16 is a cross-sectional view of an electronic device and cradle therefore, according to an embodiment of the present disclosure.

Referring to FIG. 16, an electronic device 1600 and a cradle 1621 are shown.

Inside of a housing 1601 of the electronic device 1600, a first pedestal 1617, a first motor 1603, a first shaft 1606, a second pedestal 1607, a second shaft 1608, a second motor 1605, a first gear 1609, and a second gear 1611 may be arranged.

The first pedestal 1617 may be equipped with a plurality of magnets 1615. The first pedestal 1617 may not be fixed onto the housing 1601 of the electronic device 1600.

While the electronic device 1600 is put on the cradle 1621, even if the housing 1601 of the electronic device 1600 is moved, the first pedestal 1617 may keep the orientation due to the interaction with the magnets 1625 equipped in the cradle 1621.

For example, there may be three magnets arranged on the first pedestal 1617 at intervals of 120 degrees, and there may also be three magnets arranged on the cradle 1621 at intervals of 120 degrees. A magnet mounted on the first pedestal 1617 and a magnet mounted on the cradle 1621 may have different polarity, so the attraction between the magnets may enable the first pedestal 1617 to keep the orientation as if it is fixed onto the cradle 1621. Accordingly, even if the housing 1601 of the electronic device 1600 is rotated, the first pedestal 1617 may remain in its orientation due to the magnets.

If the first motor rotates, the second pedestal 1607 connected to the first shaft 1606 of the first motor 1603, second motor 1605, and second shaft 1608 may be rotated around a first axis 1610. Furthermore, the first shaft 1606 is connected to the housing 1601 of the electronic device 1600, the housing 1601 of the electronic device 1600 may be rotated around the first axis 1610 by the rotation of the first motor 1603.

If the second motor 1605 rotates, the second shaft 1608 may be rotated around a second axis 1612. Because the second shaft 1608 is connected to the housing 1601 of the electronic device 1600, the housing 1601 of the electronic device 1600 may be rotated around the second axis 1612 by the rotation of the second motor 1605.

A front cover 1613 may be mounted on the head unit of the electronic device 1600.

Functions and effects of the other components are the same as what are described in connection with FIG. 15, so the description will be omitted herein.

Figure 17:
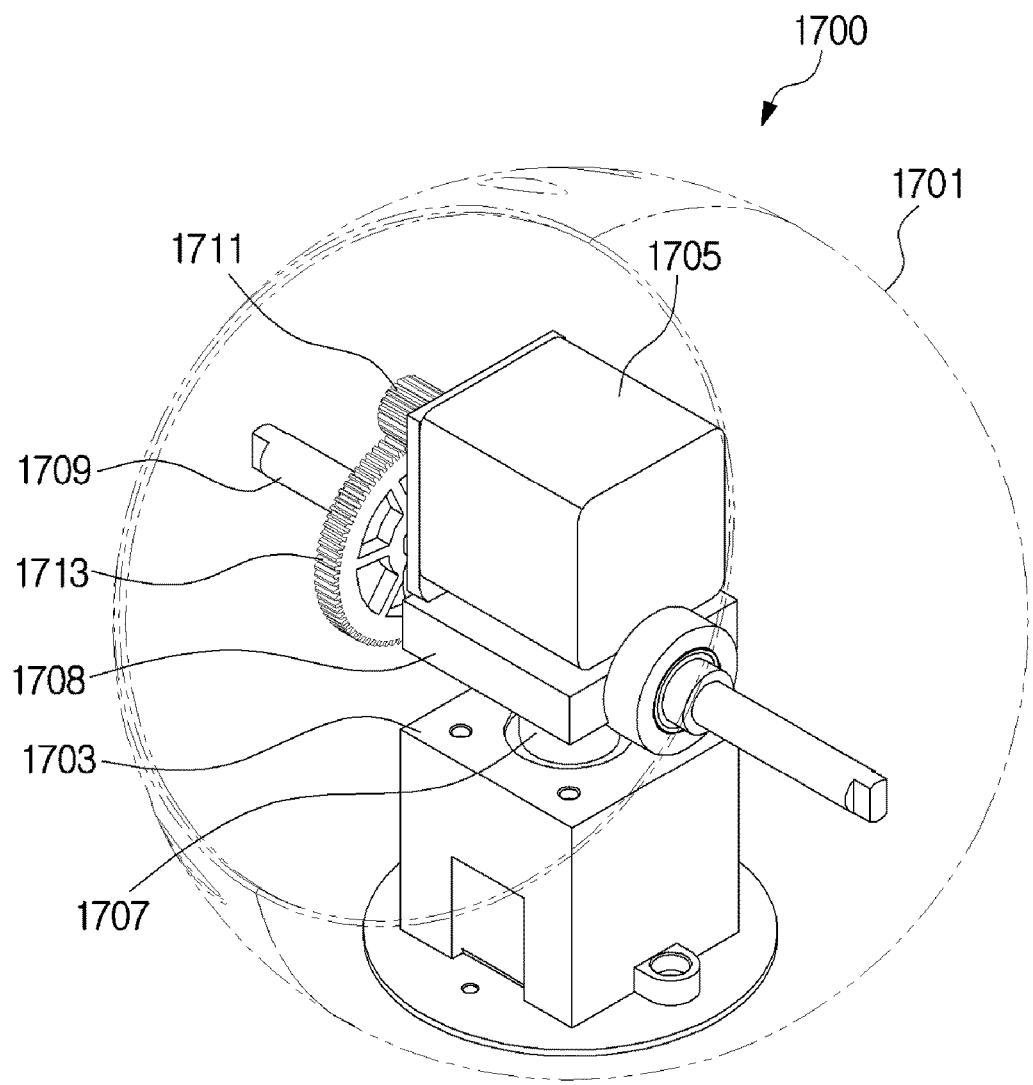
FIG. 17 is a perspective view of an electronic device, according to an embodiment of the present disclosure.

FIG. 17 is a perspective view of an electronic device, according to an embodiment of the present disclosure.

Referring to FIG. 17, a first motor 1703, a second pedestal 1708, a second motor 1705, a first gear 1711, a second gear 1713, a first shaft 1707, and a second shaft 1709 are shown.

The first gear 1711 may be relatively smaller in size than the second gear 1713. The first and second gears 1711 and 1713 may decelerate the rotation of the second motor 1705 and transfer the decelerated rotation to the second shaft 1709. The second shaft 1709 is connected to the housing 1701 of the electronic device 1700, and the housing 1701 of the electronic device 1700 may be rotated around the second shaft 1709 by the rotation of the second motor 1705.

Functions and effects of the other components are the same as what are described in connection with FIG. 15, so the description will be omitted herein.

Figure 18:
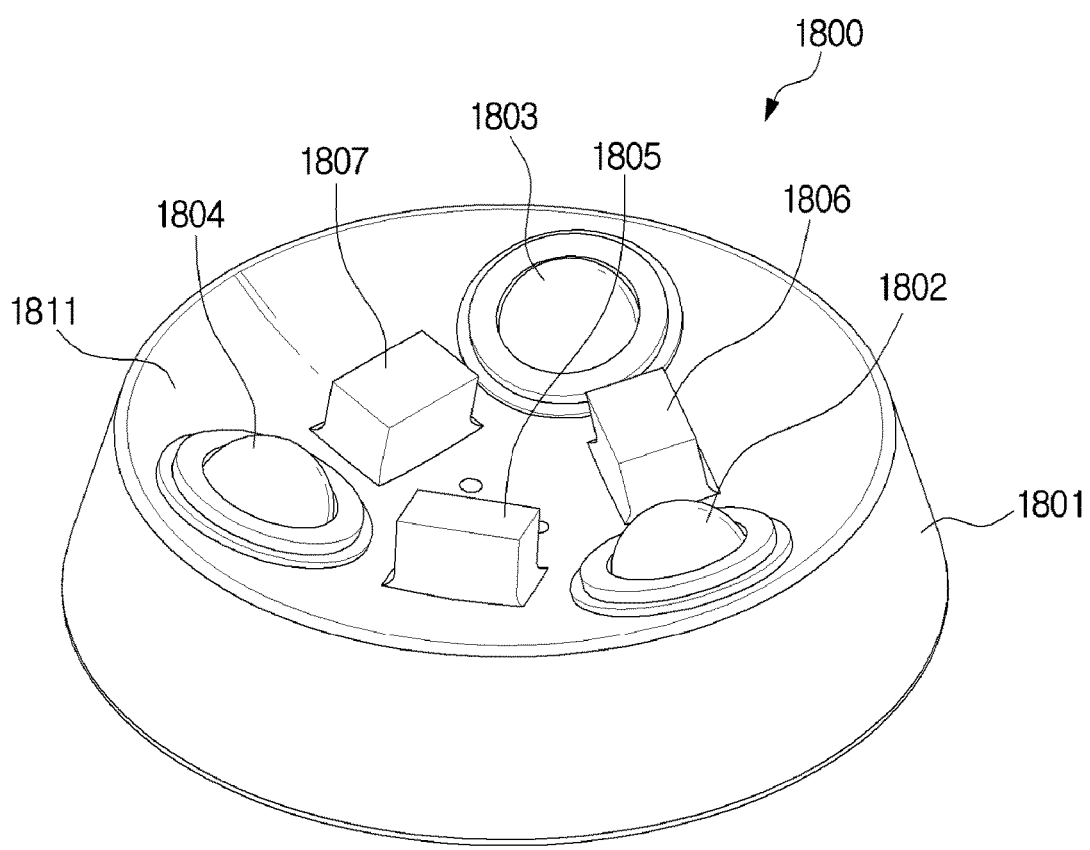
FIG. 18 is a perspective view of a cradle, according to an embodiment of the present disclosure.

FIG. 18 is a perspective view of a cradle, according to an embodiment of the present disclosure.

Referring to FIG. 18, a cradle 1800 may include a stand 1801, a plurality of balls 1802, 1803, 1804, and a plurality of magnets 1805, 1806, 1807. For example, three balls and three magnets are arranged on the stand 1801 of the cradle 1800 at intervals of 120 degrees, respectively.

The top face 1811 of the stand 1801 may be concavely formed. Because the electronic device has a hemispherical housing, when the electronic device is put on the cradle 1800, the concave face of the stand 1801 may receive the electronic device.

The plurality of balls 1802, 1803, 1804 may be made of a rubber or silicon material, serving as bearings between the electronic device and the cradle while the electronic device is put on the cradle.

The plurality of magnets 1805, 1806, 1807 may fix the first pedestal inside the electronic device not to be moved. The electronic device may be equipped with magnets having opposite polarity to the magnets mounted on the cradle, and because of the attraction between the magnets mounted on the electronic device and the cradle, the first pedestal inside the electronic device may not move while the electronic device is put on the cradle.

Figure 19:
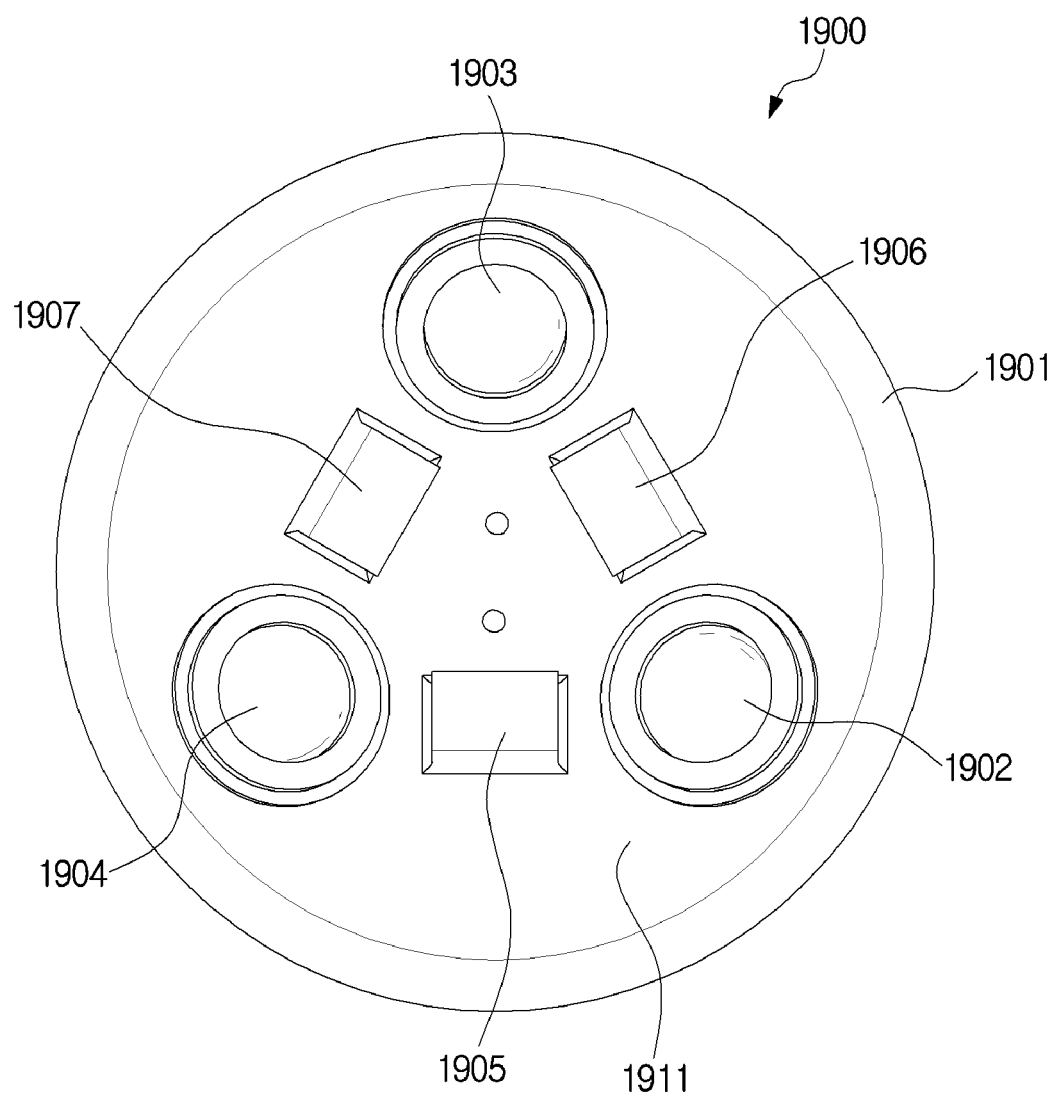
FIG. 19 is a plan view of a cradle, according to an embodiment of the present disclosure.

FIG. 19 is a plan view of a cradle, according to an embodiment of the present disclosure.

Referring to FIG. 19, a stand 1901 of a cradle 1900 may have a circular form, without being limited thereto.

The top face 1911 of the stand 1901 may be concavely formed. A plurality of balls 1902, 1903, 1904, and a plurality of magnets 1905, 1906, 1907 may be mounted on the top face of the stand 1901.

The plurality of balls 1902, 1903, 1904 may be arranged along a circle at intervals of 120 degrees. The plurality of balls 1902, 1903, 1904 may serve as bearings, minimizing frictions between the electronic device and the cradle. Accordingly, while put on the cradle, the electronic device may smoothly rotate by the balls 1902, 1903, 1904.

The plurality of magnets 1905, 1906, 1907 may be arranged along a circle at intervals of 120 degrees. Specifically, a magnet 1906 may be arranged between the balls 1902 and 1903, a magnet 1907 between the balls 1903 and 1904, and a magnet 1905 between balls 1904 and 1902. The plurality of magnets 1905, 1906, 1907 may have the same polarity. A first pedestal inside the electronic device may keep its orientation by the magnets.

In the embodiments, the shape of the cradle, and the number and arrangement of balls and magnets are only by way of example, and not limited thereto.

Figure 20:
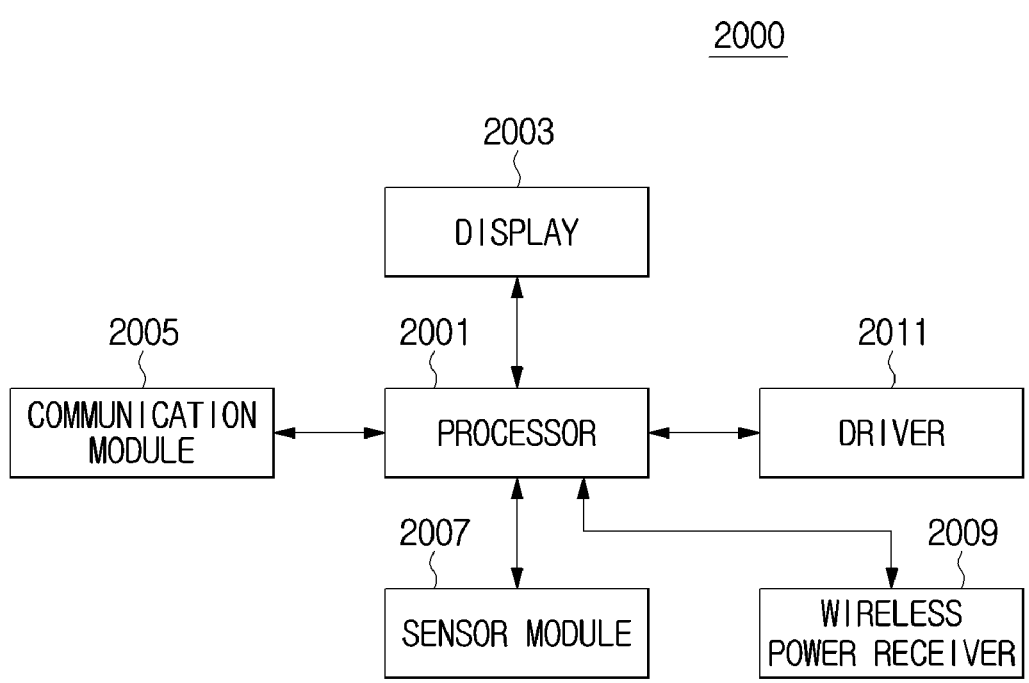
FIG. 20 is a block diagram of an electronic device, according to an embodiment of the present disclosure.

FIG. 20 is a block diagram of an electronic device, according to an embodiment of the present disclosure.

Referring to FIG. 20, the electronic device 2000 may include a processor 2001, a sensor module 2007, a communication module 2005, a display 2003, a wireless power receiver 2009, and a driver 2011.

The processor 2001 may determine whether the electronic device 2000 is put on the cradle based on a signal output from the sensor module 2007, determine a target orientation of the electronic device such that the user is located in the center of an image obtained by a camera module if the user is identified in the obtained image, and create control data to control the orientation of the electronic device 2000. The control data may include information about the orientation and information about a target orientation of the electronic device 2000.

The processor 2001 may also control the driver 2011 to change the orientation of the electronic device 2000 based on the control data.

The sensor module 2007 may sense an orientation of the electronic device 2000 and approaching of a cradle.

The driver 2011 may include a first motor to drive a first shaft and a second motor to drive a second shaft. The driver 2011 may control the rotation direction, rotation speed, and rotation torque of the respective first and second motors.

The roles and functions of the processor 2001, the sensor module 2007, the communication module 2005, the display 2003, and the wireless power receiver 2009 are the same as what are described above in connection with FIG. 8, so the description will be omitted herein.

Figure 21:
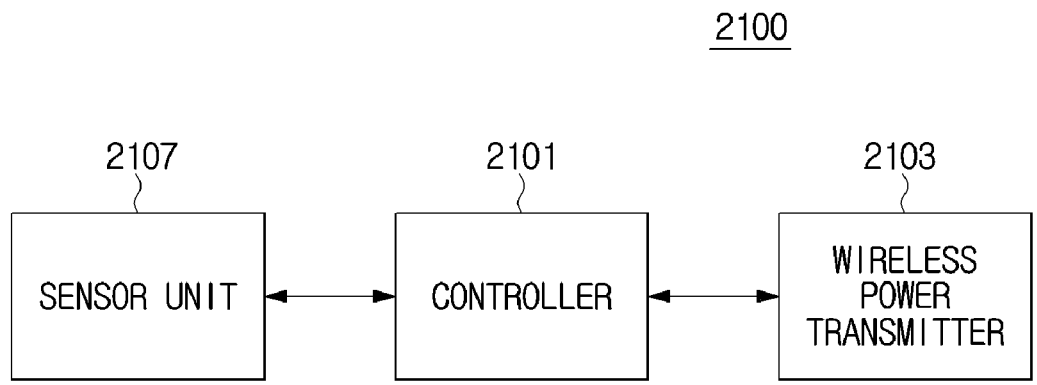
FIG. 21 is a block diagram of a cradle, according to an embodiment of the present disclosure.

FIG. 21 is a block diagram of a cradle, according to an embodiment of the present disclosure.

Referring to FIG. 21, the cradle 2100 may include a controller 2101, a sensor unit 2107, and a wireless power transmitter 2103. The roles and functions of the controller 2101, sensor unit 2107, and wireless power transmitter 2103 are the same as what are described above in connection with FIG. 9, so the description will be omitted herein.

Figure 22:
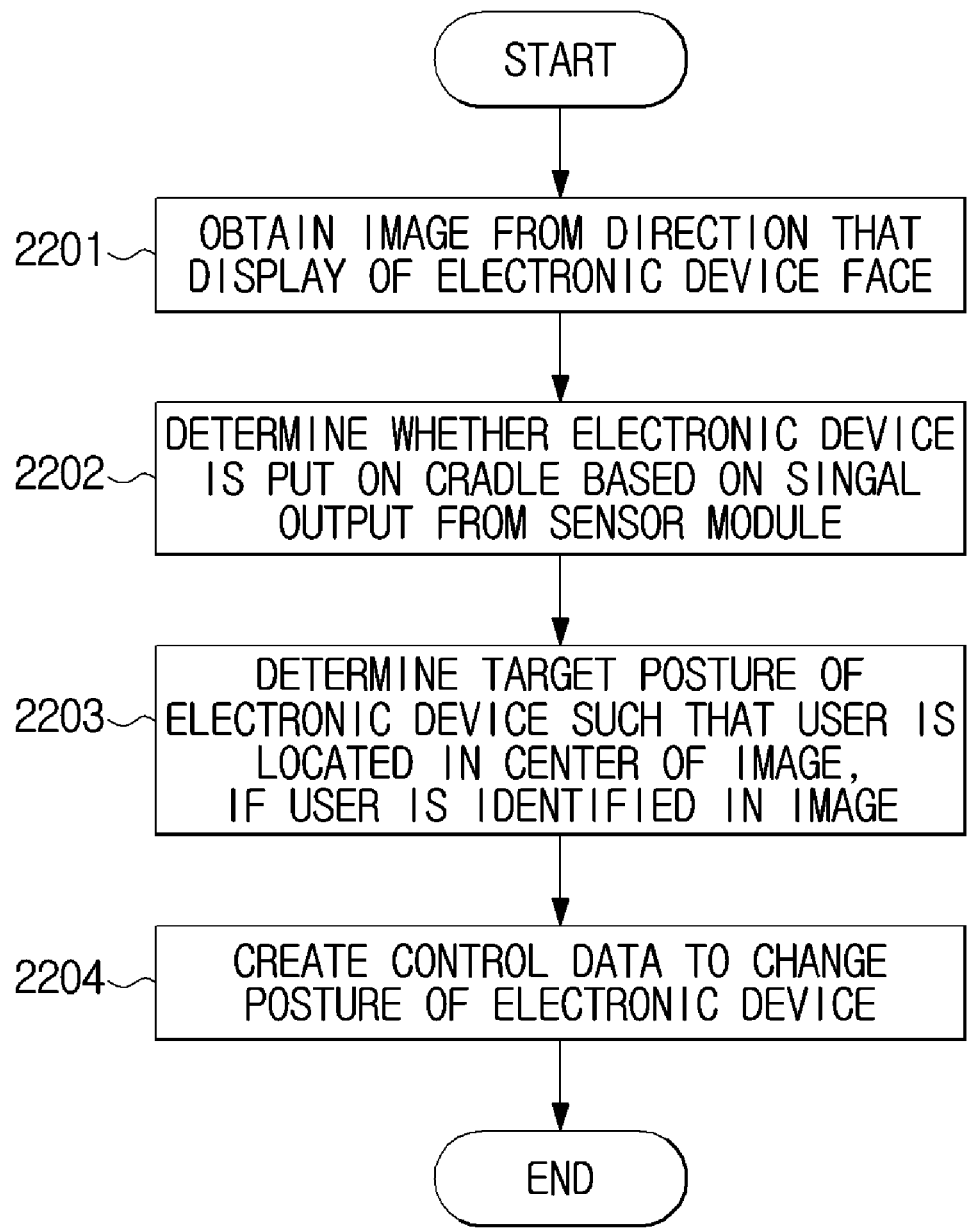
FIG. 22 is a flowchart illustrating a process to drive an electronic device, according to an embodiment of the present disclosure.

FIG. 22 is a flowchart illustrating a process to drive an electronic device, according to an embodiment of the present disclosure.

Referring to FIG. 22, the electronic device may obtain an image through the camera module from a direction to which the display of the electronic device is directed, in operation 2201.

A camera is arranged to be adjacent to the display, and the direction to which the camera is directed is the same as the direction to which the display is directed. Accordingly, the camera may capture an image in the direction that the display faces.

The electronic device may determine whether the electronic device is put on the cradle based on a signal output from the sensor module, in operation 2202.

The sensor module may include a gyro sensor, an acceleration sensor, and an approximation sensor. The sensor module may output an electric signal corresponding to the sensed information to the processor. For example, the gyro sensor and the acceleration sensor may output information about changes in orientation and rotating motions of the electronic device in electric signals. The approximation sensor may sense approaching of an object and output a corresponding electric signal.

The electronic device may determine a target orientation of the electronic device such that the user is located in the center of an image obtained by the camera if the user is identified in the image, in operation 2203.

The electronic device may determine the target orientation by identifying the user in the image obtained by the camera and calculating a distance from where the user is to the center of the image.

The electronic device may create control data to control the orientation of the electronic device, in operation 2204.

Once the target orientation is determined, the electronic device may compare the target orientation and the current orientation of the electronic device detected by the gyro sensor, and accordingly create control data. The control data may include information about the orientation and information about a target orientation of the electronic device. Furthermore, in an embodiment, the control data may be the orientation information and target orientation information itself.

The electronic device may control the driver of the electronic device to change the orientation of the electronic device using the control data.

The driver may include a first motor that rotates around a first axis and a second motor that rotates around a second axis. The electronic device may be rotated in all directions by rotation of the first and second motors, and accordingly, the front cover and the display included in the head unit of the electronic device may be directed to the direction in which the user is located.

According to embodiments of the present disclosure of an electronic device and cradle therefore, the electronic device has an appearance for the user to carry around easily, and movement of the electronic device may be controlled by interaction between the cradle and the electronic device while the electronic device is put on the cradle.

Furthermore, the electronic device has a hemispherical housing, eliminates the need for an extra mechanical structure to combine the electronic device and the cradle when the user puts the electronic device on the cradle, and allows the user to put the electronic device on the cradle without paying much attention to the orientation of the electronic device.

Embodiments as described in the specification are provided for the purpose of describing and understanding of technical concept of the present disclosure. Accordingly, the scope of the present disclosure should be construed as including all the modifications or other various embodiments based on the technical idea of the present disclosure.

What is claimed is:

1. An electronic apparatus comprising:
    a housing provided separately from a cradle without an electric contact with the cradle and rotatably placeable on the cradle;
    a display provided on the housing;
    a camera module configured to obtain an image in a direction that the display faces;
    a sensor module configured to sense an orientation of the housing; and
    a processor configured to determine a target orientation of the housing based on the obtained image, and transmit wirelessly, to the cradle, control data to change the orientation of the housing based on the sensed orientation and the target orientation of the housing,
    wherein, by an operation of the cradle based on the control data, the display provided on the housing faces a user.

2. The electronic apparatus of claim 1, wherein the control data includes at least one of information regarding the orientation of the housing, information regarding the target orientation, information regarding speed of the housing, and information regarding acceleration of the housing.

3. The electronic apparatus of claim 1, further comprising:
    a communication module,
    wherein the processor is further configured to send the control data to the cradle using the communication module.

4. The electronic apparatus of claim 1, wherein the housing comes into contact with an operation leg included in the cradle when the housing is placed on the cradle, and the orientation of the housing is changed by the operation leg.

5. An electronic apparatus comprising:
    a housing provided separately from a cradle without an electric contact with the cradle and rotatably placeable on the cradle;
    a display provided on the housing;
    a camera module configured to obtain an image in a direction that the display faces;
    a sensor module configured to sense an orientation of the housing;
    a driver provided in the housing and configured to rotate the housing around at least one of a first axis and a second axis; and
    a processor configured to determine a target orientation of the housing based on the obtained image and control the driver to change the orientation of the housing based on the sensed orientation and the target orientation of the housing,
    wherein the display provided on the housing faces a user.

6. The electronic apparatus of claim 5, wherein the driver comprises:
    a first motor configured to rotate the housing around the first axis; and
    a second motor configured to rotate the housing around the second axis.

7. The electronic apparatus of claim 6, wherein the first axis is perpendicular to the second axis.

8. The electronic apparatus of claim 6, wherein the driver comprises:
    a first shaft configured to transfer rotation of the first motor to the second motor; and
    a second shaft configured to transfer rotation of the second motor to the housing.

9. The electronic apparatus of claim 8, wherein the first shaft rotates around the first axis, and the second shaft rotates around at least one of the first and second axes.

10. The electronic apparatus of claim 6, wherein the first motor is held in a fixed position by a magnet when the housing is placed on the cradle.

11. The electronic apparatus of claim 6, wherein the second motor is rotated around the first axis when the housing is placed on the cradle.

12. The electronic apparatus of claim 6, wherein the housing is rotated around at least one of the first and second axes when the housing is placed on the cradle.

13. The electronic apparatus of claim 1, further comprising:
    a wireless power receiver configured to receive wireless power from the cradle when the housing is placed on the cradle.

14. The electronic apparatus of claim 13, wherein the processor is further configured to control the wireless power receiver to receive the wireless power from the cradle based on a signal output from the sensor module.

15. The electronic apparatus of claim 5, further comprising a wireless power receiver configured to receive wireless power from the cradle when the housing is placed on the cradle.

16. A method for controlling an electronic apparatus including a housing, the method comprising:
    sensing an orientation of the housing in a cradle, the housing being provided separately from the cradle without having an electric contact with the cradle and the housing rotatably placeable on the cradle;
    obtaining an image in a direction that a display provided on the housing faces;
    determining a target orientation of the housing based on the obtained image; and
    creating control data to change the orientation of the housing based on the sensed orientation and the target orientation of the housing,
    wherein the display provided on the housing faces a user.

17. The method of claim 16, wherein the control data includes information regarding the orientation of the housing and information regarding the target orientation.

18. The method of claim 16, further comprising:
sending the control data to the cradle using a communication module.

19. The method of claim 16, further comprising:
controlling a driver of the electronic apparatus to change the orientation of the housing based on the control data.

20. The method of claim 16, further comprising:
receiving wireless power from the cradle when the housing is placed on the cradle.

* * * * *